United States Patent
Sakagami et al.

[11] Patent Number: 5,961,291
[45] Date of Patent: Oct. 5, 1999

[54] TURBO VACUUM PUMP WITH A MAGNETICALLY LEVITATED ROTOR AND A CONTROL UNIT FOR DISPLACING THE ROTATOR AT VARIOUS ANGLES TO SCRAPE DEPOSITS FROM THE INSIDE OF THE PUMP

[75] Inventors: Seiji Sakagami, Ibaraki-ken; Masahiro Mase, Tochigi-ken; Chiaki Urano, Chiba; Shinji Koyano, Misato; Yuichi Kinoshita, Kashiwa; Takashi Nagaoka, deceased, late of Tsukuba, all of Japan, by Kikue Nagaoka, heiress

[73] Assignees: Hitachi, Ltd.; Seiko Seiki Co., Ltd., both of Japan

[21] Appl. No.: 08/921,475

[22] Filed: Sep. 2, 1997

[30] Foreign Application Priority Data

Aug. 30, 1996 [JP] Japan ................................. 8-229711

[51] Int. Cl.[6] .................................................. F04B 49/02
[52] U.S. Cl. .......................... 417/42; 417/53; 417/44.1; 417/44.11; 415/132
[58] Field of Search ................................ 417/53, 42, 44.1, 417/44.11, 63; 415/90, 131, 132, 169.1

[56] References Cited

U.S. PATENT DOCUMENTS

| 4,144,986 | 3/1979 | Smith et al. ........................... 222/52 |
| 4,944,748 | 7/1990 | Bramm et al. ........................... 623/3 |
| 5,110,264 | 5/1992 | Murry ........................................ 417/45 |
| 5,380,171 | 1/1995 | Nagaoka et al. ..................... 417/423.4 |
| 5,501,583 | 3/1996 | Nagaoka et al. ..................... 417/423.4 |
| 5,823,261 | 10/1998 | Drumheller ....................... 166/250.01 |

FOREIGN PATENT DOCUMENTS

| 4-6593 | 4/1990 | Japan . |
| 4-127893 | 11/1992 | Japan . |
| 6-101689 | 4/1994 | Japan . |

*Primary Examiner*—Charles G. Freay
*Assistant Examiner*—Robert Z. Evora
*Attorney, Agent, or Firm*—Evenson, McKeown, Edwards & Lenahna, P.L.L.C.

[57] ABSTRACT

A turbo vacuum pump has a rotor and magnetic bearings. The magnetic bearings are held in a housing having a suction port and an exhaust port, and support the rotor rotatably. A peripheral flow pump stage and screw pump stage are formed in the rotor, so that the pressure at the exhaust port can be at or near atmospheric pressure level. Before starting the turbo vacuum pump, the magnetic bearings are operated to displace a rotor position and to scrape off the reaction products which have deposited inside the pump. In addition, before starting the turbo vacuum pump, a stator of the pump is heated up to decrease a binding force of the reaction products. Therefore, the pump can be restarted, even if the rotor has locked by the solidification of deposited reaction products formed during stopping of the pump.

20 Claims, 18 Drawing Sheets

LEVITATION OF ROTOR

DISPLACE TOWARD
X1 DIRECTION

DISPLACE TOWARD
X2 DIRECTION

TURBO VACUUM PUMP WITH A MAGNETICALLY LEVITATED ROTOR AND A CONTROL UNIT FOR DISPLACING THE ROTATOR AT VARIOUS ANGLES TO SCRAPE DEPOSITS FROM THE INSIDE OF THE PUMP

BACKGROUND AND SUMMARY OF THE INVENTION

The present invention relates to a turbo vacuum pump in which pressure in an exhaust port is at or near the atmospheric level.

In recent years, due to the need for manufacturing miniature semiconductor elements and freedom from maintenance, to evacuate a filming apparatus such as the etching apparatus or chemical vapor deposition (CVD) apparatus a turbo vacuum is frequently used, in which magnetic bearings are provided to retain a rotor in a non-contact manner. Magnetic forces of electromagnets are used to float the rotor. An example of such a turbo vacuum pump is disclosed as a hybrid turbo molecular pump in Japanese Utility Model Laid-Open No. 127893/1992.

In this hybrid turbo molecular pump, a rotor having rotor vanes and screw grooves is rotatably housed in a casing having a suction port and an exhaust port, while stator vanes and a screw stator are mounted on the inner wall of the casing in positions confronting the rotor vanes and the screw grooves. Moreover, electromagnets are separately attached to the rotor, for generating radial and axial forces. The position of the rotor is detected by radial sensors and an axial sensor so that the exciting currents of the individual electromagnets are controlled on the basis of the outputs of those sensors to retain the rotor in a predetermined floating position.

The rotor thus magnetically levitated is rotated at a high speed. The rotor vanes and the screw grooves are rotated at a high speed relative to the stator vanes and the screw stator, to produce the pumping action so that the gas sucked from the suction port is compressed, and exhausted from the exhaust port. This exhaust port is connected to the suction side of a roughing vacuum pump such as an oil-sealed rotary pump or a dry pump using no oil in its working chamber.

When this pump is used in filming devices such as etching or CVD apparatus, a reaction product (e.g., aluminum chloride) may stick to or deposit on the inside of the pump. This deposit is is scraped off by detecting its amount and by the rotor rotating at varying angles within such a range that, if the detected deposit amount exceeds a predetermined value, the rotor and the stator are kept out of contact.

Another example of the turbo vacuum pump, in which the rotor is supported by the magnetic bearings so that the pump can be evacuated from the atmospheric pressure, is disclosed in Japanese Patent Laid-Open No. 101689/1994. In this example of the prior art, in a housing having a suction port and an exhaust port, there is disposed an exhaust pump unit having a peripheral flow pump stage and a centrifugal pump stage. A rotor having an integral construction of an exhaust pump unit and a motor for driving the exhaust pump unit is supported at its two end portions by magnetic bearings, and a seal is arranged between the suction port at the opposite side of the exhaust pump unit and the motor.

In the hybrid turbo molecular pump, as disclosed in the aforementioned Japanese Utility Model Laid-Open No. 127893/1992, when the deposition of the reaction product exceeds a predetermined value it is scraped off by rotating the rotor at an angle at a high speed, causing the reaction products which have stuck to and deposited on the rotor and stator, to collide with each other. As a result, a large sound or vibration may occur at an instant when the reaction products collide with each other. Moreover, the thin rotor vanes having a poor rigidity may warp so that, in the worst case of abnormal vibrations, if the balance is lost because of such warp, the rotor and the stator may contact and break, thereby impeding semiconductor manufacture.

Furthermore, since the hybrid turbo molecular pump cannot be operated at atmospheric pressure, it must be stopped when the vacuum chamber is returned to atmospheric pressure so that it may be cleaned. At the restart, the reaction products, deposited on the rotor or the stator, may congeal during cooling down, so that the hybrid turbo molecular pump is difficult to restart.

In the turbo vacuum pump disclosed in Japanese Patent Laid-Open No. 101689/1994, on the other hand, the vanes of the peripheral flow pump and the centrifugal pump are highly rigid, and the reaction product is constantly scraped off during the rotor rotation so that no special control is required. However, no consideration is given to restarting the pump after it is stopped, and the torque of the high-frequency motor for driving the pump rotor is insufficient to overcome the frictional resistance of the reaction product which has stuck to the rotor and the stator during the pump stop. Therefore, restart of the pump is difficult. If it fails to restart, the pump has to be overhauled, thus diminishing the maintenance free advantages obtained by using magnetic bearings.

An object of the present invention is to provide a turbo vacuum pump for exhausting from atmospheric pressure, which has magnetic bearings and can be restarted even if a reaction product sticks to its rotor and stator.

Another object of the invention is to provide a maintenance-free turbo vacuum pump to be exhausted from the atmospheric pressure.

A further object of the present invention is to provide an operating method capable of operating the vacuum pump maintenance-free.

Still another object of the present invention is to realize a highly reliable turbo vacuum pump with a long lifetime, that can exhaust from the atmospheric pressure, and a method of operating such a pump.

Still another object of the present invention is to provide a highly reliable turbo vacuum pump suited for exhausting a reaction product, and a method of operating the pump.

In order to achieve the above-specified objects, according to a first embodiment of the present invention, there is provided a turbo vacuum pump comprising: a housing having a suction port and an exhaust port; a stator retained in the housing; magnetic bearings mounted in the housing; a rotary shaft supported rotatably by the magnetic bearings; a drive unit for driving the rotary shaft; and a control unit for controlling the magnetic bearings, so that a gas sucked from the suction port is compressed and exhausted to the atmosphere from the exhaust port. A first sensor detects the RPM of the rotary shaft; and a second sensor detects either the electric current or the power of the drive means. The control unit includes a command unit for feeding the magnetic bearings with a command for displacing the rotary shaft by a predetermined amount if the detected value of the second sensor exceeds a predetermined value when the first sensor detects the rotary shaft is at a standstill.

According to a second embodiment of the invention, there is provided a turbo vacuum pump comprising: a housing having a suction port and an exhaust port; a stator retained in the housing; magnetic bearings mounted in the housing; a rotary shaft supported rotatably by the magnetic bearings; a drive unit for driving the rotary shaft; and a control unit for controlling the magnetic bearings, so that a gas sucked from the suction port is compressed and exhausted to the atmosphere from the exhaust port. A first sensor detects the RPM of the rotary shaft; a second sensor detects the acceleration time of the rotary shaft; and a controller controls the starts/stops of the magnetic bearing control unit and the drive unit on the basis of the detected values of the first and second sensors.

Preferably, the rotary shaft is provided with a centrifugal compression pump impeller and a multistage peripheral flow impeller sequentially from the side of the suction port, and the stator forms a multistage peripheral flow compression pump stage together with the peripheral flow impeller. Alternatively, the rotary shaft is provided with a screw slot pump impeller and a multistage peripheral flow impeller sequentially from the side of the suction port; and the stator forms a screw slot compression pump stage and a multistage peripheral flow compression pump stage together with the screw slot impeller and the peripheral flow impeller.

According to a third embodiment of the invention, there is provided a method of operating a turbo vacuum pump having a rotary shaft supported rotatably by magnetic bearings for exhausting to the atmosphere, in which the rotary shaft is displaced a predetermined number of times by the magnetic bearings before the turbo vacuum pump is rotationally started.

According to a fourth embodiment of the invention, there is provided a method of running a turbo vacuum pump having a rotary shaft supported rotatably by magnetic bearings for exhausting to the atmosphere. If either the motor current or consumed electric power exceeds a predetermined value at the time of starting the turbo vacuum pump, rotation is stopped and the rotary shaft is displaced a predetermined number of times by the magnetic bearings.

According to a fifth embodiment of the invention, there is provided a method of running a turbo vacuum pump having a rotary shaft supported rotatably by magnetic bearings for exhausting to the atmosphere. If at the time of starting the turbo vacuum pump the rate of increase of the RPM of the rotary shaft is below a predetermined value, rotation is stopped and the rotary shaft is displaced a predetermined number of times by the magnetic bearings. Moreover, in a preferred embodiment, after the rotary shaft has been displaced, a purge gas is fed from purge gas feed ports which are formed in bearing chambers for retaining the magnetic bearings, or the rotary shaft is displaced within a range in which it is kept out of engagement with touchdown bearings arranged in the vicinity of the magnetic bearings. Displacement of the rotary shaft may be a movement parallel to the center of the rotary shaft, a reciprocation along the rotary shaft, a conical motion on the axial center of the rotary shaft, or a conical motion on the vicinity of one end portion of the rotary shaft. Alternatively, the movement of the rotary shaft may be forward and reverse rotations through a small angle.

Moreover, if the rotary shaft acceleration is below a predetermined acceleration threshold, even when the movement of the rotary shaft is made a predetermined number of times, an audio or visual warning is given.

Preferably, moreover, a heating control unit heats the stator to a temperature ranging from 100° C. to 180° C. before a start of the turbo vacuum pump or after a stop of the rotation of the turbo vacuum pump.

According to a sixth embodiment of the invention, there is provided a turbo vacuum pump comprising: a housing having a suction port and an exhaust port; a stator retained in the housing; magnetic bearings mounted in the housing; a rotary shaft supported rotatably by the magnetic bearings; a drive unit for driving the rotary shaft; and a control unit for controlling the magnetic bearings, so that a gas sucked from the suction port is compressed and exhausted to the atmosphere from the exhaust port. The rotary shaft is provided with a centrifugal compression pump impeller and a multistage peripheral flow impeller sequentially from the side of the suction port, and the stator forms a multistage peripheral flow compression pump stage together with the peripheral flow impeller. A first sensor detects the RPM of the rotary shaft; and a second sensor detects an abnormality of the rotary shaft. A heating unit heats the stator, and a first controller displaces the rotary shaft by a predetermined amount on the basis of the detected values of the first and second sensors, while a second controller heats the stator to a temperature ranging from 100° C. to 180° C.

By means of the present invention, it is easily determined from the starting state of the rotary shaft that reaction product is stuck and deposited between the impeller and the stator of the turbo vacuum pump or between the shaft and the casing, and an overload upon the motor can thus be prevented to improve the reliability. If rotor lock due to the reaction product is confirmed at the start, the magnetic bearings are controlled to rock the pump rotor by the attractions of the magnetic bearings, so that the reaction product can be displaced. As a result, the pump can be restarted even if the torque of the drive motor is low. By comparing the motor current value, the RPM and the acceleration time at the start, moreover, a build up of reaction product is detected to displace the pump rotor so that the time period required for the control can be shortened. Since the pump rotor is displaced before the rotational start of the turbo vacuum pump, moreover, the starting time period can be shortened, and the rotational start can be ensured by removing the reaction product in such a deposition amount as will not lead to the rotor lock.

Even if the pump rotor is displaced to rock, moreover, the warning is made without accelerating the rotor so that the cause for a trouble can be clarified to cope with the trouble speedily. As a result, the time period, which seriously affects the semiconductor manufacturing process, is drastically shortened. When the rotor is not restarted even after if it has been displaced a set number of times, the stator is heated to a temperature lower than its heat treatment level (e.g., 180° C.) and higher than the water evaporation level (e.g., 100° C.), so that the solid aluminum chloride can be sublimated without lowering the performance of the vacuum pump. As a result, the pump can be restarted, and the performance drop which might otherwise be caused by the thermal deformation can be avoided because the heating temperature is lower than the level for the heat treatment of the stator material.

As a result, it is possible to provide a turbo vacuum pump for exhausting from the atmospheric pressure, which can be restarted even if the reaction product sticks during its stop, and which can exploit the advantage of the completely clean and maintenance free magnetic bearings.

Other objects, advantages and novel features of the present invention will become apparent from the following detailed description of the invention when considered in conjunction with the accompanying drawings.

DETAILED DESCRIPTION OF THE PREFERRED EMBODIMENTS

The present invention will be described in connection with its several embodiments with reference to the accompanying drawings.

Figure 1:
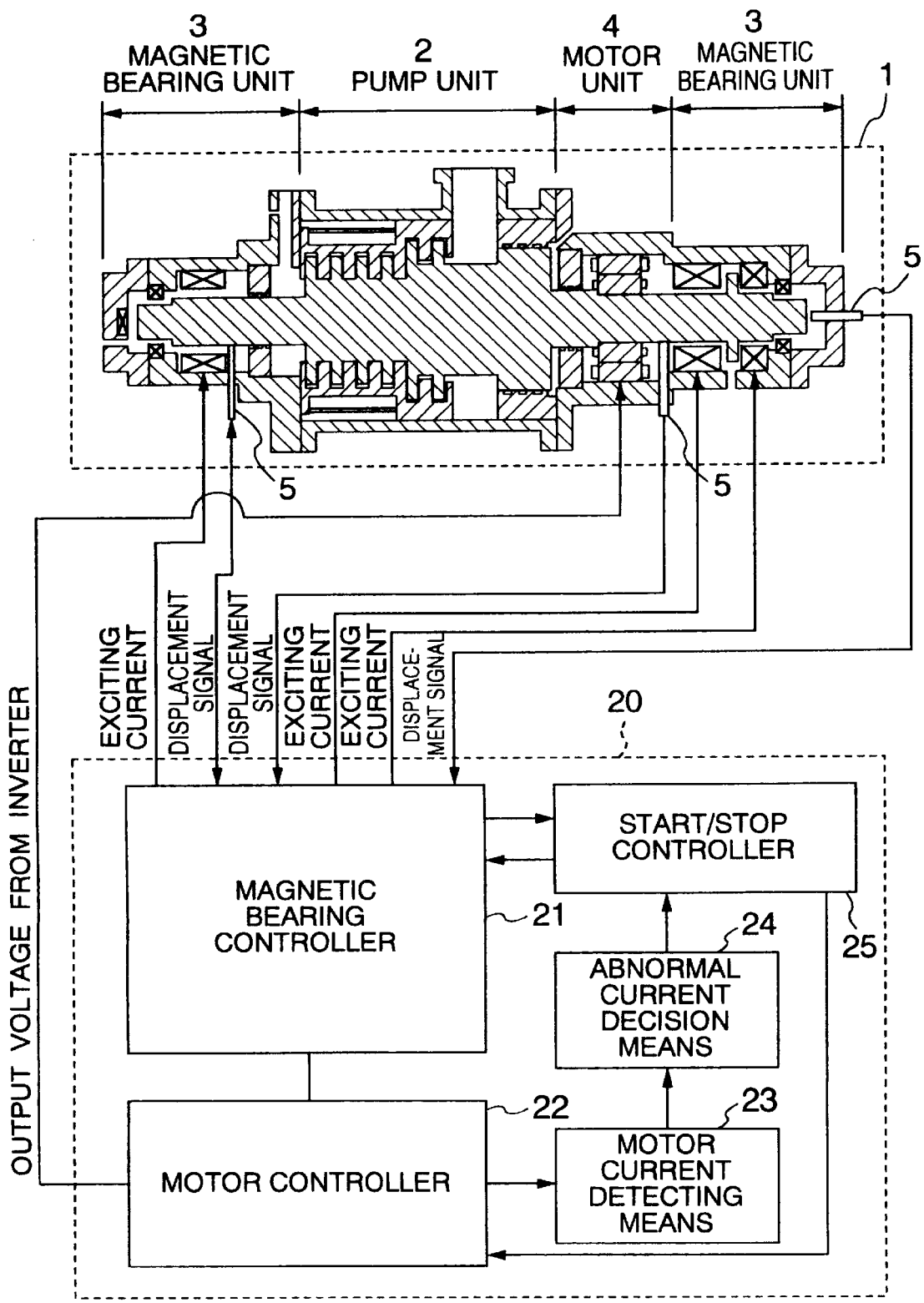
FIG. 1 is a block diagram of a first embodiment of a turbo vacuum pump according to the present invention.

FIG. 1 is a block diagram showing a first embodiment of a turbo vacuum pump according to the present invention. A turbo vacuum pump 1 is constructed to include a pump unit 2, magnetic bearing units 3, a motor unit 4 for driving the pump unit 2, and position sensors 5 for detecting the position of a rotor. On the other hand, a controller 20 is constructed to include a magnetic bearing control unit 21 for controlling the supporting states of the magnetic bearings, a motor control unit 22 for driving the motor, a sensor 23 for detecting the value of an electric current to be fed to the motor, decision means 24 for detecting an abnormality if the current value exceeds a predetermined value, and a controller 25 for controlling the starts/stops of the magnetic bearings and the motor. On the basis of a displacement signal from the position sensors 5 attached to the turbo vacuum pump 1, the magnetic bearing control unit 21 controls currents which excite the magnetic bearings. When the turbo vacuum pump 1 is controlled to a predetermined position, the motor control unit 22 generates a signal indicating it. The start/stop controller 25 controls the starts/stops of the motor and the magnetic bearing circuit. The motor control unit 22 controls the inverter output voltage (in a motor having an inverter) to control the RPM of the motor. The abnormal current decision unit 24 compares the current value (detected by the motor current sensor 23) with a predetermined reference current value, and sends a signal to the start/stop controller 25 if the reference current value is exceeded. In response to an abnormality signal from the abnormal current decision unit 24, the start/stop controller 25 sends separate start/stop commands to the motor control unit 22 and the magnetic bearing control unit 21.

The details of the turbo vacuum pump according to the present invention will be described with reference to FIG. 2. A rotor 103 is rotatably accommodated in a housing 100 having a suction port 101 and a discharge port 102. A rotor shaft 103A, at one end of the rotor 103, is supported by a thrust-active magnetic bearing 104 and a radial active magnetic bearing 105, while a rotor shaft 103B, at the other end of the rotor 103, is supported by a radial-active magnetic bearing 106. Between the radial-active magnetic bearings 105, 106 and the individual shaft ends, there are interposed touchdown bearings 107, 108. The radial-active magnetic bearing 105, the thrust-active magnetic bearing 104 and the touchdown bearing 107 are housed in a bearing chamber 109 formed at one end of the housing 100, and the radial-active magnetic bearing 106 and the touchdown bearing 108 are housed in a bearing chamber 110 attached to the other end of the housing 100.

In the bearing chamber 109, there is also housed a motor 111 for driving the rotor 103. In the vicinity of the radial-active magnetic bearings 105 and 106, there is disposed a position sensor 112 for detecting the position in the radial direction. At the end portion of the rotor shaft 103A, there is disposed a position sensor 113 for detecting the position in the thrust direction. In the axial direction between the suction port 101 and the exhaust port 102, there is formed a discharge pump unit, in which are arranged sequentially (starting from the side of the suction port 101) a centrifugal compression pump stage 50a and a peripheral flow compression pump stage 60A which collectively form the discharge pump.

A screw seal 114 is arranged axially between the suction port 101 and the motor 111, and a labyrinth seal 115 is axially arranged between the screw seal 114 and the motor 111. Between the bearing chamber 110 and the peripheral flow compression pump stage 60A, there is also arranged a labyrinth seal 116 sealing the exhaust pump unit and the bearing chamber 110. The bearing chambers 109 and 110 are provided with purge gas feed ports 117 and 118, through which an inert gas such as nitrogen can be fed as a purge gas from the outside to the vacuum pump.

Figure 2:
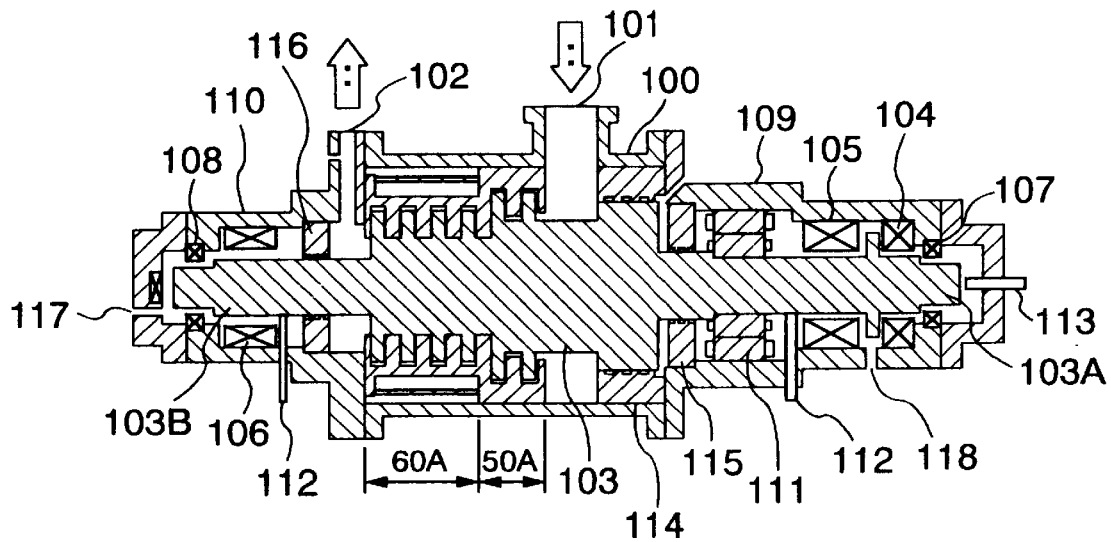
FIG. 2 is a longitudinal section of the turbo vacuum pump according to the present invention.
Figure 3:
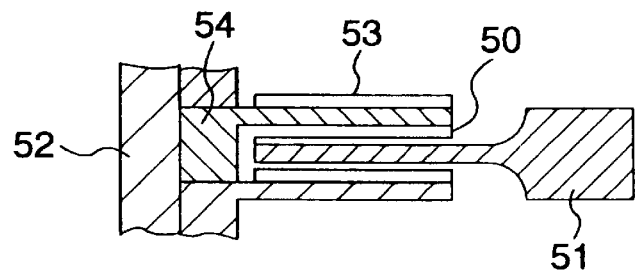
FIG. 3 is a longitudinal section showing a portion of a centrifugal compression pump stage in an enlarged scale.
Figure 4:
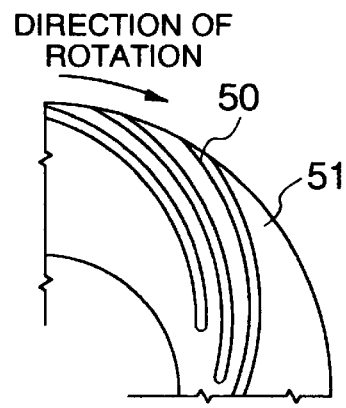
FIG. 4 is a plan view of a centrifugal impeller for the centrifugal compression pump stage shown in FIG. 3.
Figure 5:
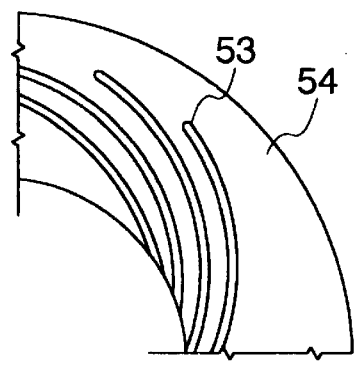
FIG. 5 is a plan view of a centrifugal impeller for the centrifugal compression pump stator shown in FIG. 3.
Figure 6:
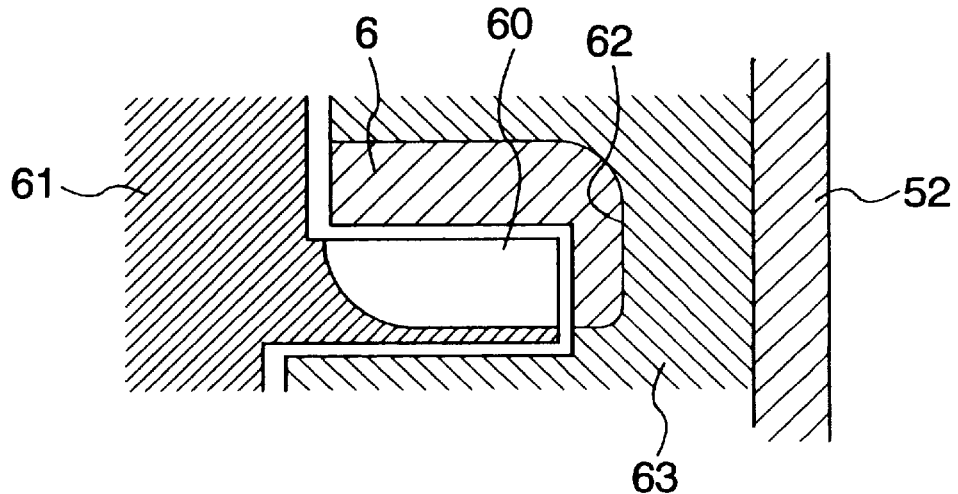
FIG. 6 is a longitudinal section showing a portion of a peripheral flow compression pump stage in an enlarged scale.
Figure 7:
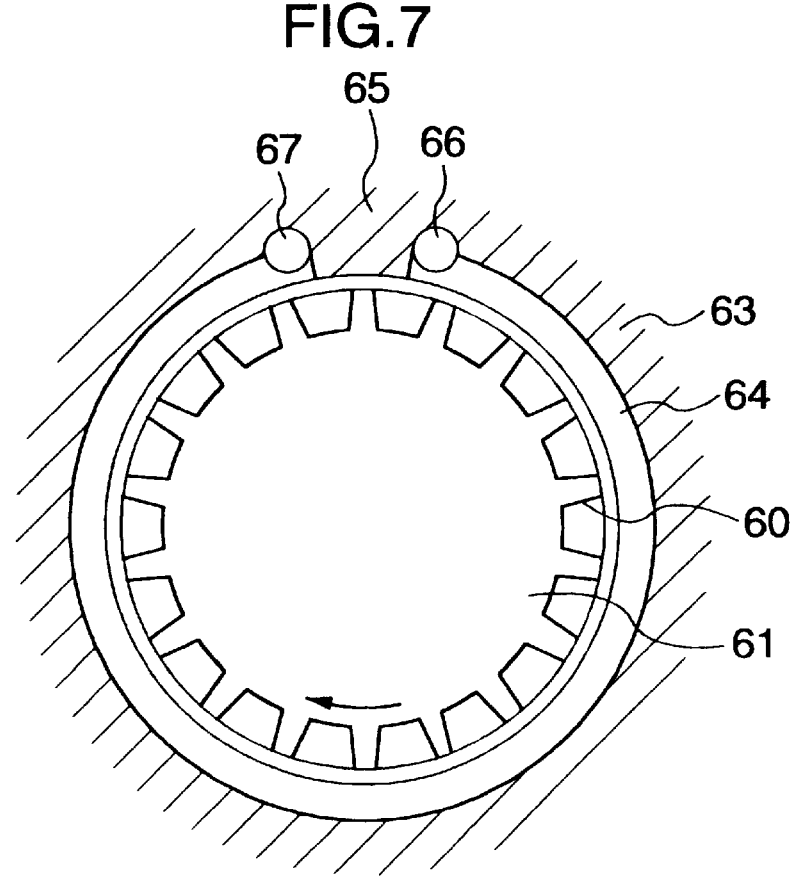
FIG. 7 is a transverse section showing a portion of the peripheral flow compression pump stage in an enlarged scale.

Further, details of the exhaust pump stage of the turbo vacuum pump, as shown in FIG. 2, will be described with reference to FIGS. 3 to 7. The turbo vacuum pump is equipped at its suction port side with a centrifugal compression pump stage, as shown in FIGS. 3 to 5, and at its exhaust port with a peripheral flow compression pump state, as shown in FIGS. 6 and 7. FIG. 3 is a longitudinal section showing a port of the centrifugal compression pump stage in an enlarged scale; FIG. 4 is a top plan view of the impeller of the centrifugal compression pump stage; and FIG. 5 is a top plan view of a centrifugal compression pump stator. The centrifugal compression pump stage is constructed by alternately arranging an open type impeller 51 having a plurality of sweepback vanes 50 on its surface, as shown in FIGS. 3 and 4, and a stator 54, as shown in FIGS. 3 and 5. The stator 54 is mounted in a housing 52 and equipped with a plurality of vanes 53 confronting the back face of the impeller 51.

FIG. 6 is a longitudinal section showing a portion of the peripheral flow compression pump stage in an enlarged scale, and FIG. 7 is a transverse section of the same. The peripheral flow compression pump stage is constructed, as shown in FIGS. 6 and 7, by alternately arranging an impeller 61 having a plurality of radial vanes 60 on its outer circumference and a stator 63 attached to the housing 52, and having U-shaped slots 62 in its face confronting the impeller 60. Between the impeller 61 and the stator 63, there is formed a ventilation passage 64, which is equipped with a partition 65 at its one peripheral portion. A suction port 66 is formed rotationally in front of the partition 65, and an exhaust port 67 is formed rotationally at the back of the same.

The pump unit of the turbo vacuum pump thus constructed is driven at a high rotational speed by the motor, so that it compresses the gas sucked from the suction port formed in the housing, and exhausts it to the atmosphere from the exhaust port.

Figure 8:
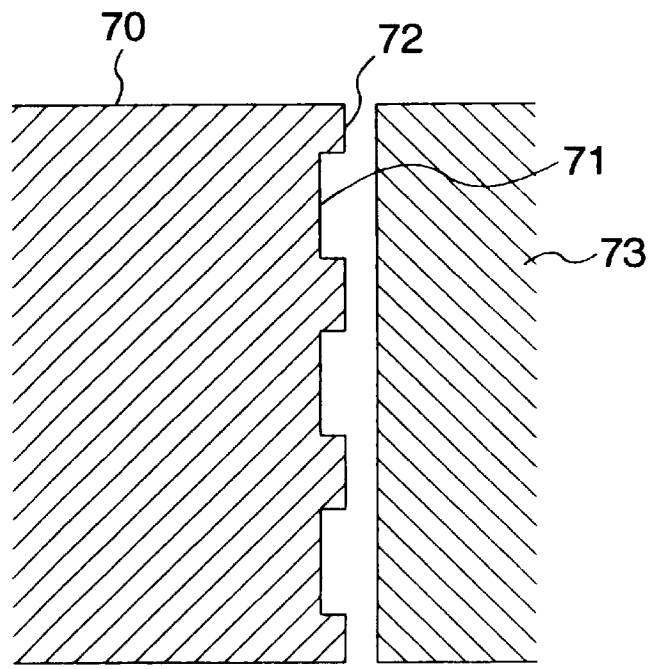
FIG. 8 is a longitudinal section showing a screw slot compression pump stage in an enlarged scale.
Figure 9:
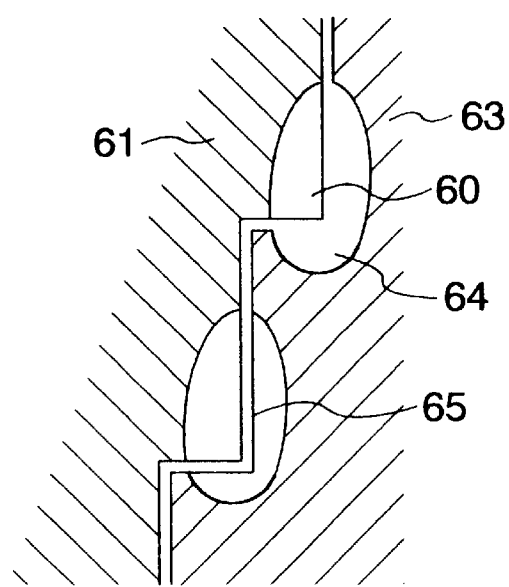
FIG. 9 is a longitudinal section showing a peripheral flow compression pump stage in an enlarged scale.

Another example of the discharge pump of the turbo vacuum pump according to the present invention is shown in FIGS. 8 and 9. The turbo vacuum pump is provided at its suction port side with a screw slot compression pump stage, as partially shown in an enlarged scale in a longitudinal section in FIG. 8 and at a discharge port side with a peripheral flow compression pump stage, as partially shown in an enlarged scale in a longitudinal section in FIG. 9. In the screw slot compression pump stage, a helical screw slot 71 and a screw ridge 72 are formed on a screw slot impeller 70, and a cylindrical stator 73 is arranged to confront the screw slot impeller 70. On the other hand, the peripheral flow impeller 61 is formed into a cylindrical step shape from the top to the bottom, and the convex corners of the individual cylindrical steps are provided with a plurality vanes 60. The stator 63 is positioned to confront the peripheral flow vanes 61 through clearances, and the concave corners of the steps are provided with ventilation passages 64 and partitions 65 at its one peripheral portion. In this exhaust pump unit, too, the gas, as sucked from the suction port, is compressed as in the aforementioned pump unit and is exhausted from the exhaust port to the atmosphere.

Of course, the construction of the pump components should not be limited to that of the aforementioned embodiment but may be modified such that the combination of the centrifugal compression pump stage and the peripheral flow compression pump stage shown in FIG. 9 is replaced by the combination of the screw slot compression pump stage and the peripheral flow compression pump stage shown in FIGS. 6 and 7. In this combination, too, the gas sucked from the suction port, can be compressed and exhausted from the exhaust port to the atmosphere. Upstream of the combination, moreover, there may be arranged an axial flow compression pump stage. This combination can drastically improve the performances such as the achievable pressure and exhaust rate of the pump.

Operation of the first embodiment of the present invention thus constructed will be described in the following.

When the pump is started, the magnetic bearing control unit 21 responds to displacement signals from the position sensors 5, controlling the magnetic bearing exciting currents to levitate the pump unit magnetically in a predetermined position. The magnetic bearing control unit 21 also sends a signal to the motor control unit 22 which generates a command that activates the motor to rotate the turbo vacuum pump 1. The motor current value is detected by the motor current detecting means 23, and is compared with a reference current value in the abnormal current decision means 24. If an abnormality is detected, the start/stop controller 25 feeds start/stop commands separately to the motor control unit 22 and the magnetic bearing control unit 21.

If the present turbo vacuum pump is used as an exhaust pump of an apparatus for dry etching aluminum, the aluminum chloride in a gas phase is exhausted and tends to stick to or deposit on a lower temperature portion of the pump unit 2 because of poor discharge of the aluminum chloride gas. During running, the pump unit 2 is heated to a high temperature by the compressions of the pump unit 2 so that the reaction product (or the aluminum chloride) hardly deposits. Since the pump unit 2 rotates at a high speed, the reaction product is continuously scraped off even if it sticks or deposits.

As a result, the stick of the reaction product raises no problem.

However, when the pump is stopped, the reaction product may be more or less left between the rotor and the stator of the pump unit 2. If the turbo vacuum pump 1 is operated in this condition, the rotor will be floated because the magnetic bearings are generating a sufficient floating force, but the torque of the motor for driving the rotor may be so low that it cannot accelerate the rotor. As a result, the motor current increases so greatly that the abnormal current decision unit recognizes an abnormal condition, and the start/stop controller 25 sends a stop command to the motor control unit 22. While the magnetic bearing control unit 21 is retaining the command to float the rotor, the motor control unit 22 again sends a command to drive the motor. These operations are performed a predetermined number of times to scrape off the reaction product gradually bit by bit. As a result, the starting torque is lowered to a level sufficient for starting the rotor, and the rotor is started and then accelerated. It should be noted in this regard that the rotation of the rotor and the floating of the rotor may be stopped simultaneously.

Figure 10:
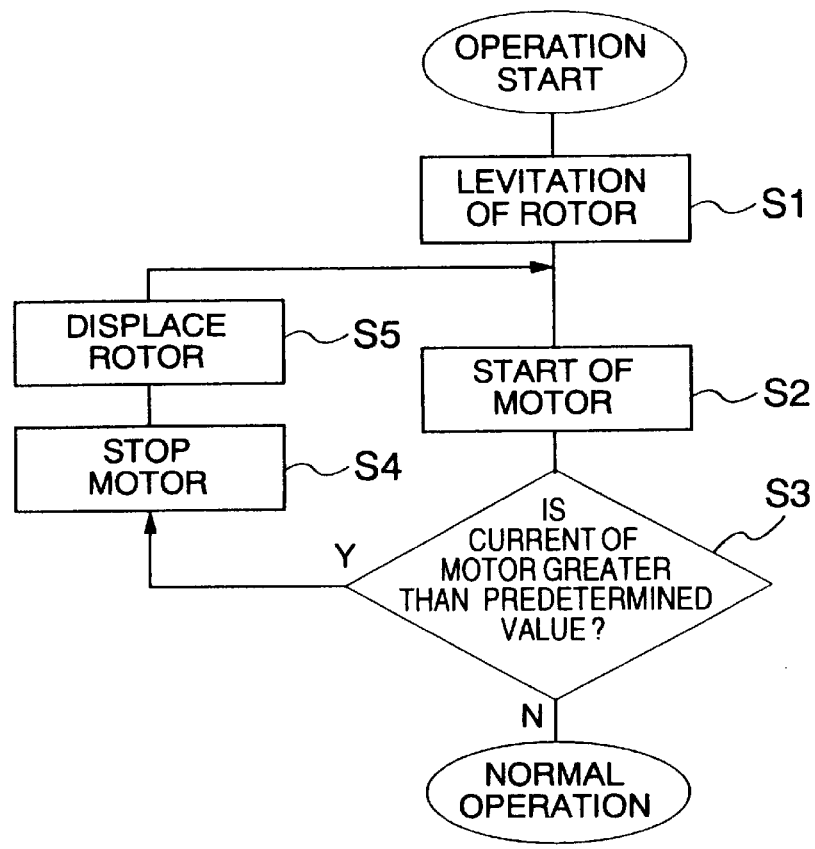
FIG. 10 is a flow chart showing the operations of the first embodiment of the present invention.
Figure 11:
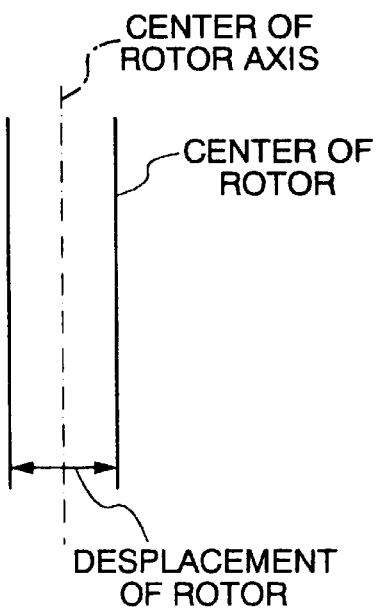
FIG. 11 is a schematic diagram showing a moving state of a pump rotor.

In addition, there may be adopted a running method, as shown by a flow chart in FIG. 10. Specifically, as operation of the turbo vacuum pump is started, the rotor is floated at Step s1 by the action of the magnetic bearings, and the motor is started at Step s2. It is decided at Step s3 whether the motor current value is abnormal and over a predetermined value. If so, the motor is stopped at Step s4. At next Step s5, the magnetic bearing control unit 21 continues to float the rotor and changes the attractions of the magnetic bearings to translate the rotor in parallel to its axis of rotation as shown in FIG. 11, for example. After this moving control, the motor is started again at Step s2 to accelerate the turbo vacuum pump 1 to a steady RPM. Thus, the adhesion of reaction product stuck and deposited between the rotor and the stator in the pump unit 2 is broken, so that the motor can be restarted, scraping away the deposits.

In still another method, a purge gas feed port is formed in the bearing chambers of the turbo vacuum pump, and purge gas is fed from the purge gas ports after starting of the turbo vacuum pump. The subsequent operations are similar to those of FIG. 10, but an operation to raise the pressure of the purge gas is added after the motor stop at Step s4. After the end of the moving control of the rotor, the purge gas pressure is returned to the initial level, and the motor is started again. In this manner, the reaction product stuck and deposited between the rotor and the stator can be prevented from invading the bearing chambers after being scraped off.

Figure 12:
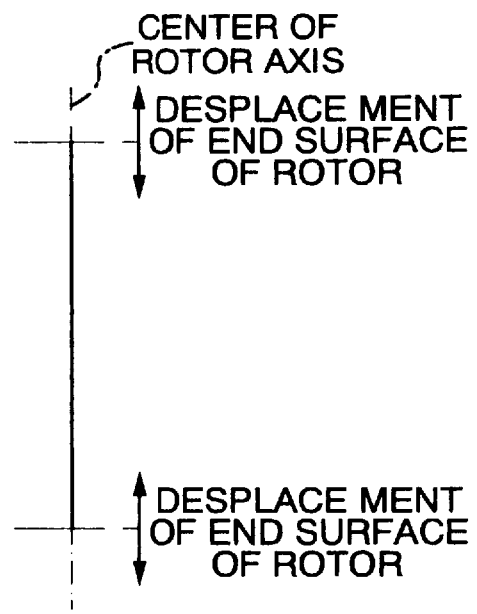
FIG. 12 is a schematic diagram showing another moving state of the pump rotor.
Figure 13:
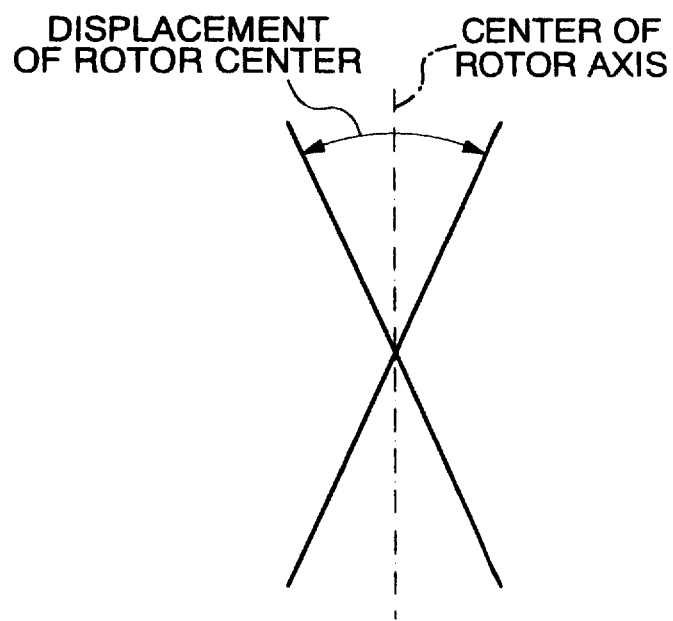
FIG. 13 is a schematic diagram showing still another moving state of the pump rotor.
Figure 14:
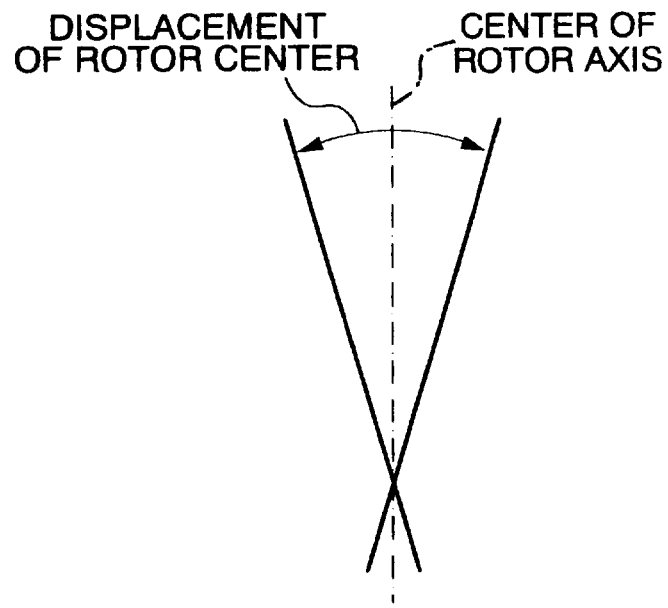
FIG. 14 is a schematic diagram showing still another moving state of the pump rotor.
Figure 15:
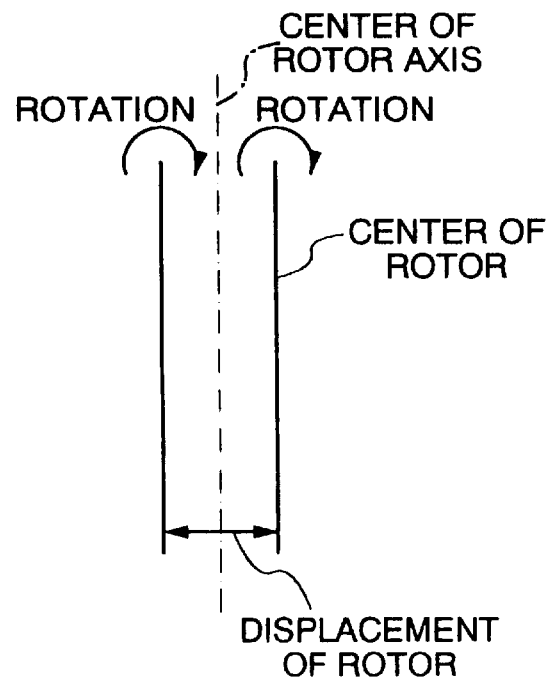
FIG. 15 is a schematic diagram showing still another moving state of the pump rotor.

For the purpose of the operating method shown in FIG. 10, the rotor may also be moved either to rock longitudinally along the rotary shaft arranged on the longitudinal axis, as shown in FIG. 12, or to incline the upper and lower end portions of the rotary shaft arranged on the longitudinal axis, in opposite directions with respect to the axis of rotation, as shown in FIG. 13. Furthermore, as shown in FIG. 14, the rotor may also be moved to swing on one end portion of the shaft arranged on the longitudinal axis or as shown in FIG. 15, the pump rotor may be turned forwardly and reversely a predetermined number of times by a small angle. If the pump rotor is moved by any of the methods shown in FIGS. 11 to 14, the reaction product can be scraped off in restarting the turbo vacuum pump.

Figure 16:
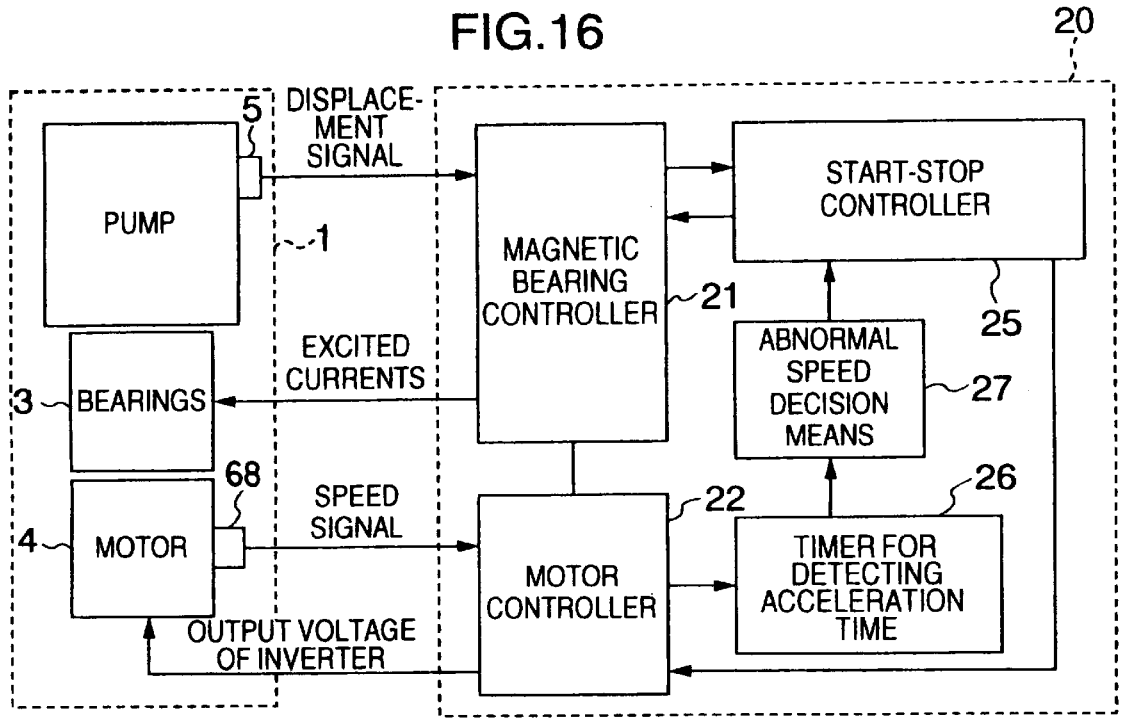
FIG. 16 is a block diagram showing a second embodiment of the turbo vacuum pump according to the present invention.

FIG. 16 is a block diagram of a second embodiment of the turbo vacuum pump according to the present invention. (The same parts as those of the first embodiment (FIG. 1) are designated by the same reference numerals, and their description will be omitted). This second embodiment differs from the embodiment of FIG. 1 with regard to the means for detecting the abnormal state. Moreover, in place of the motor current detecting means, in this embodiment, the controller 20 has a detector 68 for measuring RPM of the motor and an acceleration timer 26. The speed of the motor (RPM) is measured at the end of a predetermined time interval, as measured by the acceleration timer 26, and is compared with a predetermined threshold value in an abnormal acceleration decision unit 27. If the motor RPM is less than the predetermined value, then an abnormal state is detected, and the abnormal acceleration decision unit 27 sends a signal to the start/stop controller 25. (Of course, the acceleration may also be determined on a continuous bases, based on the measured time and RPM, but such arrangement is more costly in terms of computer processing capacity.)

In response to the abnormality signal from the abnormal acceleration decision unit 27, the start/stop controller 25 sends start/stop commands separately to the motor control unit 22 and the magnetic bearing control unit 21.

Figure 17:
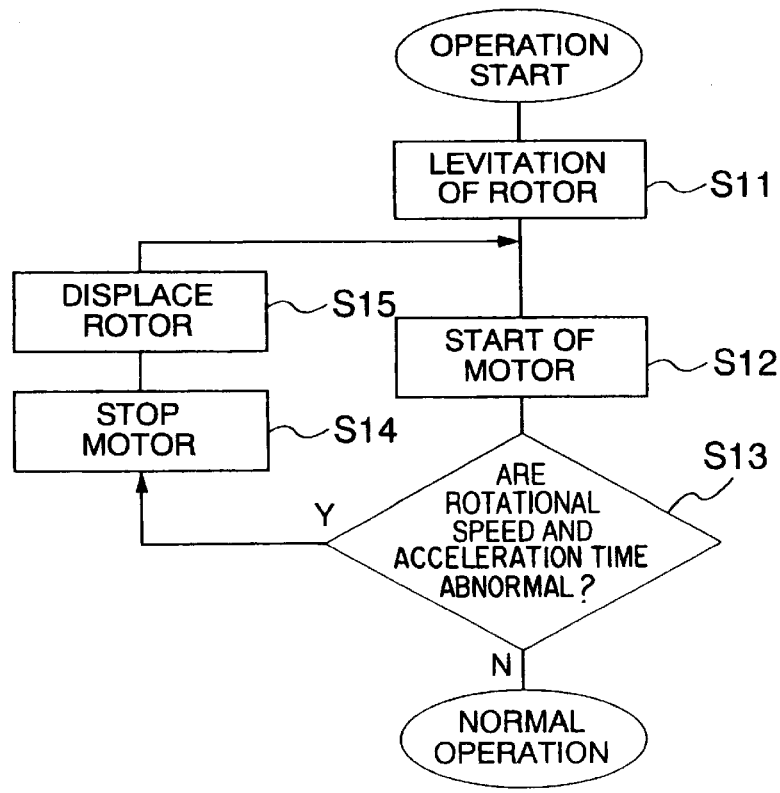
FIG. 17 is a flow chart showing the operations of the second embodiment of the present invention.

A flow chart of this running method of the second embodiment is shown in FIG. 17. When operation of the turbo vacuum pump is started, the rotor is floated at Step s11 by the actions of the magnetic bearings, and rotation of the motor is started at Step s12. At next Step s13, the presence of an abnormality is determined based on the RPM and the acceleration time. If the motor RPM is less than the predetermined value after expiration of a predetermined time interval, the motor is stopped at Step s14. At next Step s15, the rotor is moved, while being floated, by the commands from the magnetic bearing control unit 21 by the attractions of the magnetic bearings. After such movement, the routine returns to Step s12, at which the motor is started to accelerate the turbo vacuum pump 1 to the steady RPM, and the steady run is continued.

As in the first embodiment, purge gas feed ports are formed in the bearing chambers of the turbo vacuum pump so that the purge gas may be fed from a purge gas ports after starting of the turbo vacuum pump. In this manner, reaction product previously stuck and deposited between the rotor and the stator, which has been scraped off, can be prevented from entering the bearing chambers. Any of the methods, as shown in FIGS. 11 to 15, may be employed for moving the rotor.

Figure 18:
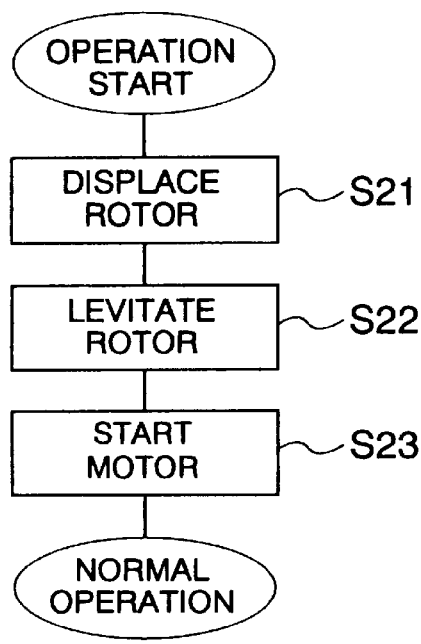
FIG. 18 is a flow chart showing the operations of a third embodiment of the turbo vacuum pump according to the present invention.
Figure 19:
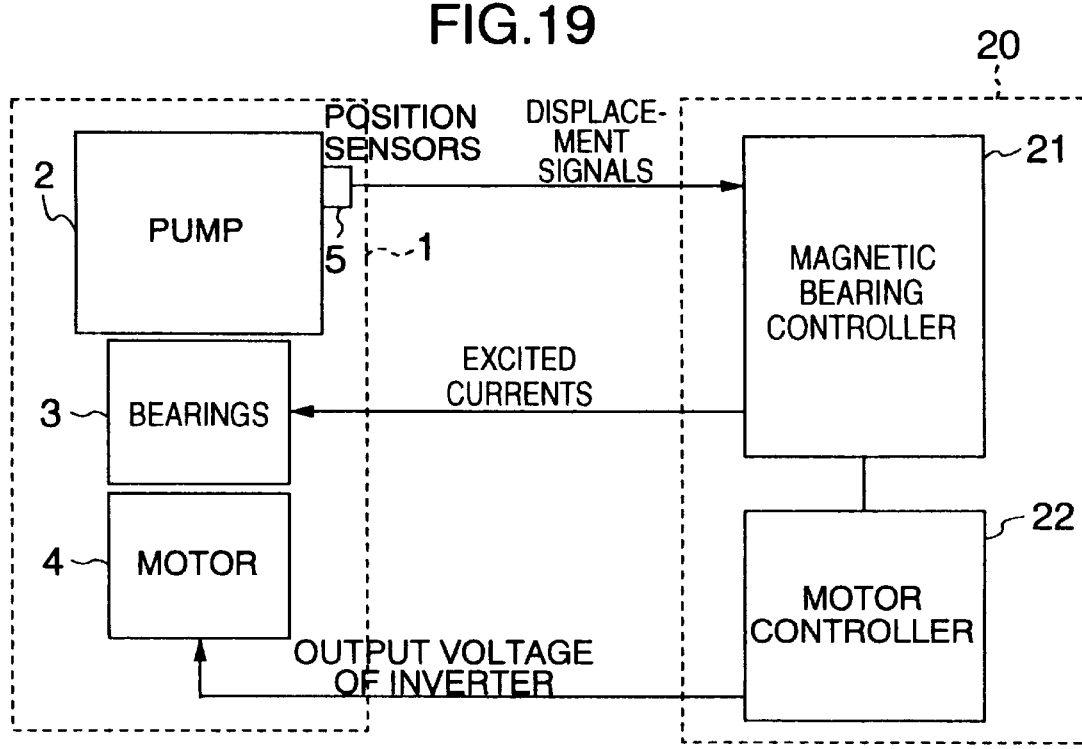
FIG. 19 is a block diagram of the third embodiment of the present invention.

A running method of a third embodiment of the turbo vacuum pump according to the present invention is shown in a flow chart in FIG. 18 and in a block diagram in FIG. 19. When the turbo vacuum pump is started, at Step s21, the magnetic bearing control unit 21 feeds the magnetic bearings with control commands to move the rotor by attraction of the magnetic bearings. On the basis of the displacement signals outputted from the position sensors 5, the commands of the exciting currents are sent at Step s22 from the magnetic bearing control unit 21 to levitate the pump unit 2 magnetically in a predetermined position. At Step s23, the command is sent from the magnetic bearing control unit 21 to the motor control unit 22 so that the motor control unit 22 generates the command to drive the motor. As a result, the turbo vacuum pump 1 is started and accelerated to the steady RPM until it continues the steady run.

Any of the methods shown in FIGS. 11 to 15 may be employed as in the first and second embodiments for moving the rotor. In the present embodiment, the turbo vacuum pump can be reliably restarted by the simple control system while suppressing the cost.

Figure 20:
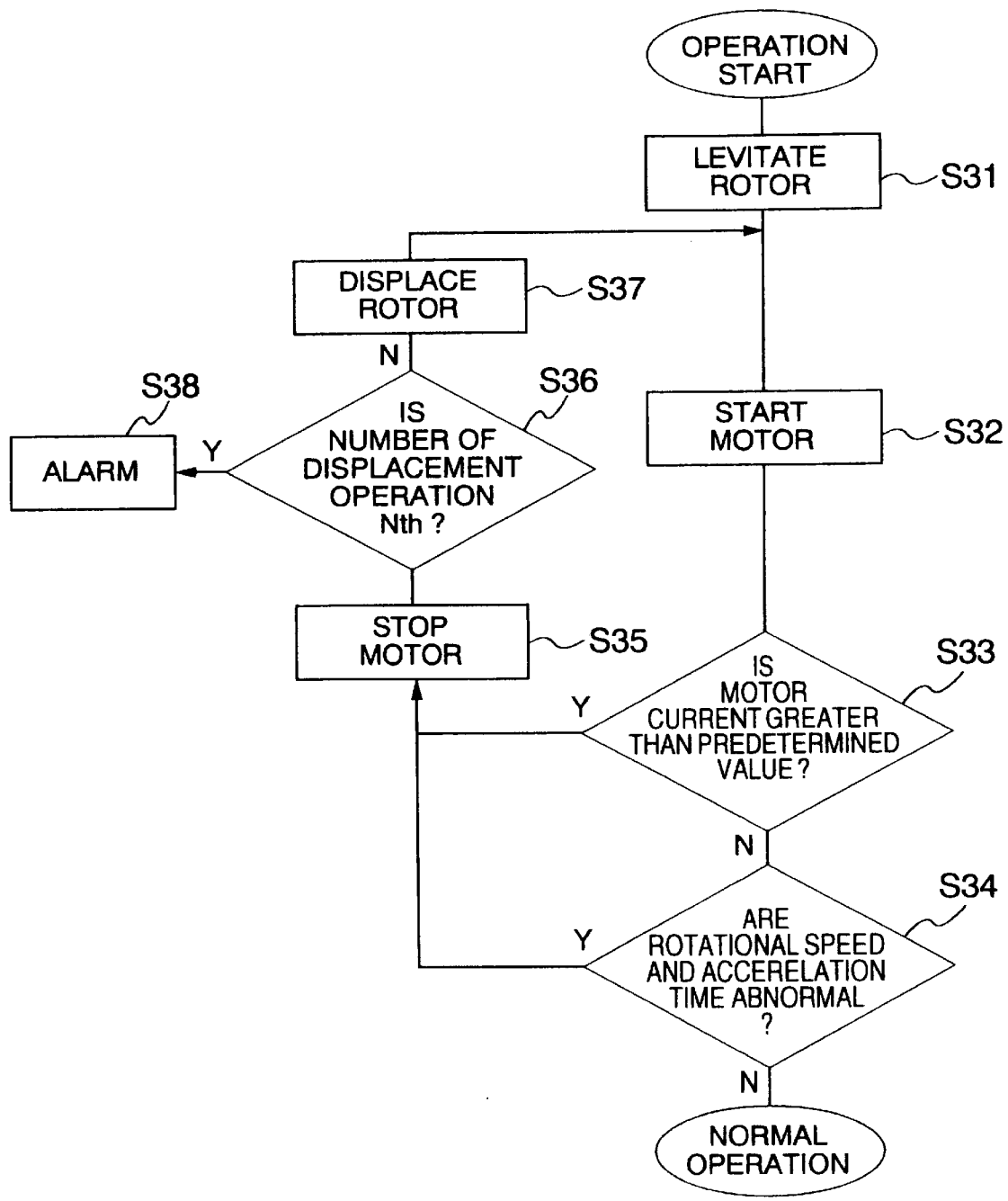
FIG. 20 is a flow chart showing the operations of a fourth embodiment of the turbo vacuum pump according to the present invention.

A flow chart of a running method of a fourth embodiment of the turbo vacuum pump according to the present invention is shown in FIG. 20, which combines the abnormality detection techniques of the embodiments of FIGS. 10 and 17. In the embodiment of FIG. 20, turbo pump operation is initiated by floating the rotor at Step s31 and starting the rotation of the motor at Step s32. In Step s33, the motor current is compared with a predetermined threshold value and judged to be abnormal if it exceeds the threshold, while in step s34 the acceleration is checked in terms of RPM and acceleration time to determine if it is below a predetermined value. If an abnormality is detected in either of Steps s33 and s34 (that is, the current is abnormally high or the acceleration abnormally low), then the motor is stopped in Step s35. In Step s36, the number of times that the rotor has previously been displaced (in order to correct the abnormality) is checked. If it exceeds a preset limit (indicating that a predetermine number N of previous displacements have failed to correct the abnormality), then an alarm (a lamp or a sound, for example) is activated. If, however, the number of previous attempts to correct the problem is less than N, then the rotor is displaced in step s37 in one of the modes described previously and the process is repeated until either the problem is corrected (no abnormality detected in Steps s33 and s34) or N attempts have been made.

In the present embodiment, even if the control is made to rock the pump rotor, the warning is performed while the rotor is not accelerating, so that the cause of trouble can be identified speedily. As a result, it is possible to drastically shorten the time period during which a semiconductor manufacturing process is not run. Although both the detection of an abnormality both in terms of the current, and of the RPM and the acceleration time are performed simultaneously, the warning may be made based on only one detected abnormality.

Figure 21:
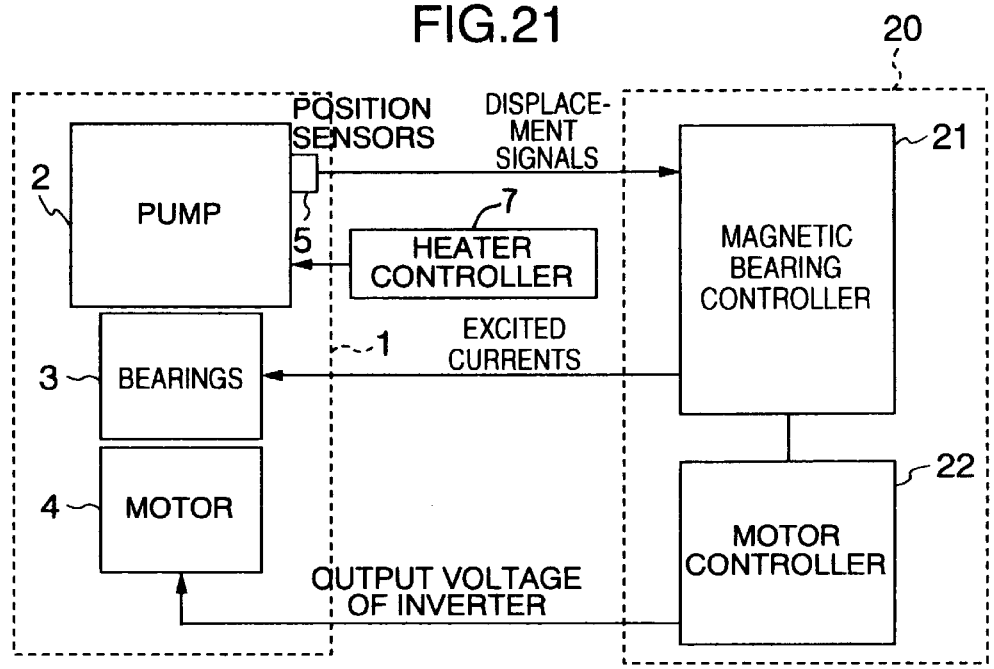
FIG. 21 is a block diagram showing a fifth embodiment of the turbo vacuum pump according to the present invention.

A block diagram of a running method of a fifth embodiment of the turbo vacuum pump according to the present invention is shown in FIG. 21, which differs from the third embodiment (FIG. 19), in the provision of a unit 7 for a heating control of the stator. This stator heating control unit 7 controls the stator temperature to reach a predetermined level before the pump is started. The predetermined temperature is set to a level higher than 180° C. but lower than the level of the heat treatment of the stator.

Figure 22:
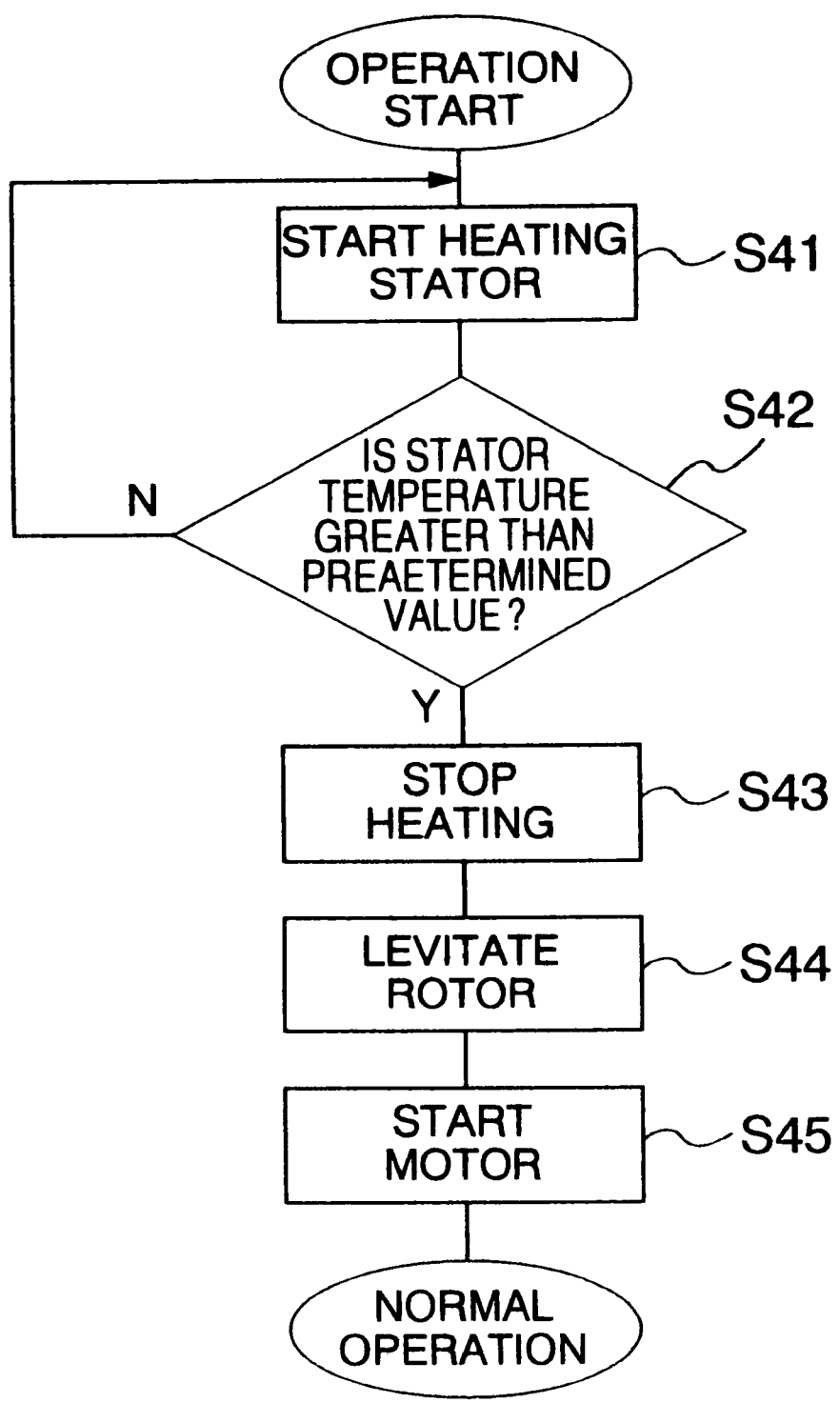
FIG. 22 is a flow chart showing the operations of the fifth embodiment of the present invention.

A flow chart of the operation of the fifth embodiment is shown in FIG. 22. When the operation of the turbo vacuum pump is initiated, a command to heat the stator is outputted at Step s41 from the heating control means 7. On the basis of the output of a temperature sensor attached to the stator, at Step s42, the heating control means 7 controls the current which flows to the heater attached to the stator. When the stator temperature reaches the aforementioned predetermined level, the power supply to the heater is stopped at Step s43. Thereafter, the rotor is floated at Step s44 by the command coming from the magnetic bearing control unit 21, and the motor is started at Step s45 by the command of the motor control unit 22. By thus heating the stator before the start, the solid aluminum chloride can be sublimated to reduce the frictional resistance at the restart of the pump. Moreover, the heating temperature is lower than that of the heat treatment of the stator material so that no performance drop, as might otherwise be caused by the thermal deformation or the like, will occur.

Figure 23:
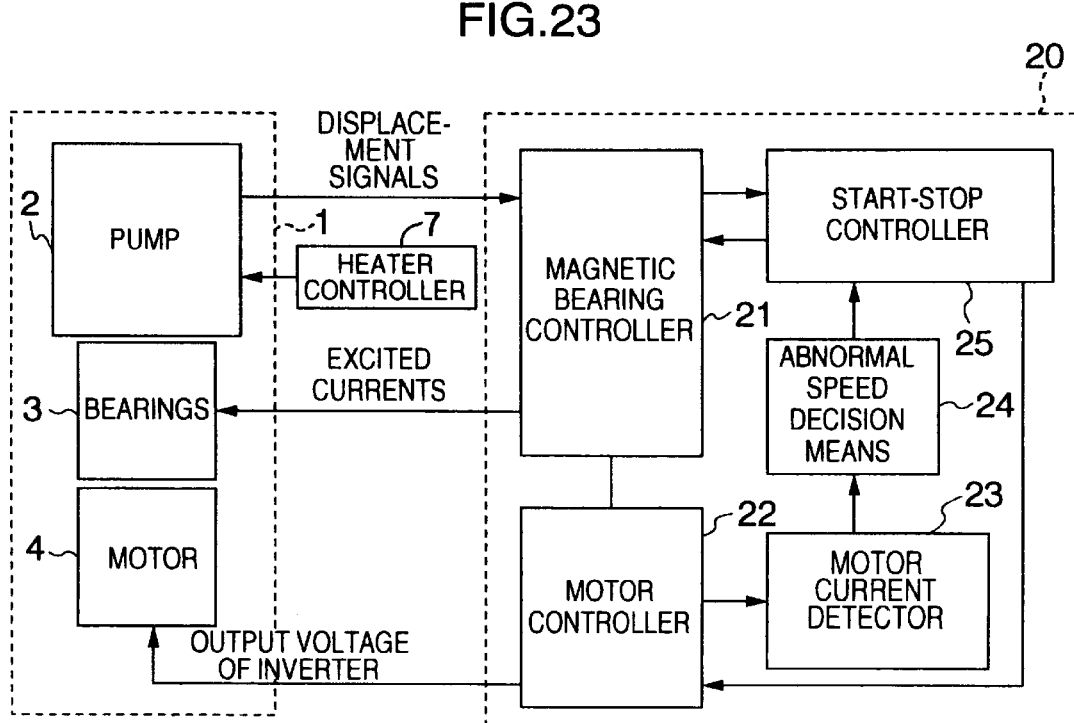
FIG. 23 is a block diagram of a sixth embodiment of the turbo vacuum pump according to the present invention.

A block diagram of a sixth embodiment of the turbo vacuum pump according to the present invention is shown in FIG. 23. In this embodiment, a unit for heating the stator is added to the construction of the first embodiment shown in FIG. 1. The means and method for heating the stator are similar to those of the fifth embodiment.

Figure 24:
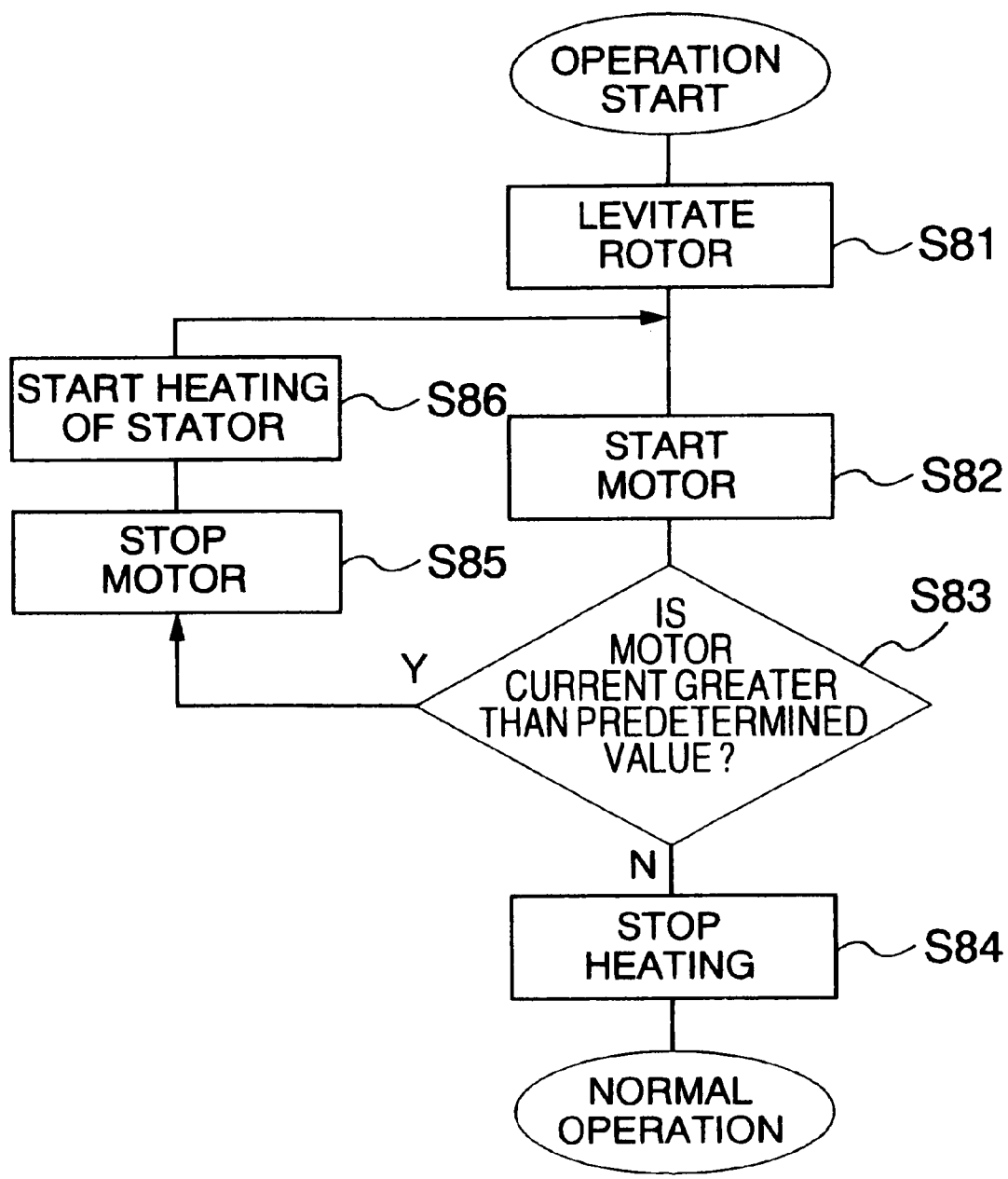
FIG. 24 is a flow chart showing the operations of the sixth embodiment of the present invention.

A flow chart of the running method of this turbo vacuum pump is shown in FIG. 24. When the operation of the turbo vacuum pump is commenced, the rotor is floated at Step s81 by the magnetic bearings, the motor is driven at Step s82, and any abnormality of the motor current value is detected at Step s83. If an abnormal current is detected, the motor is stopped at Step s85, and at Step s86, the stator is heated to a predetermined temperature. When this temperature level is reached by the stator, the aluminum chloride has been sublimated, and the motor control unit generates a command to start the motor at Step s82. At Step s82, the motor current is again checked for abnormality. If it is lower than the predetermined value, heating of the stator is stopped at Step s84. Since the temperature of the stator is thus controlled on the basis of the motor current value, the stator need not be heated to avoid the unnecessary heating if the frictional resistance is low, so that the energy can be saved without deteriorating the reliability of the individual parts.

Figure 25:
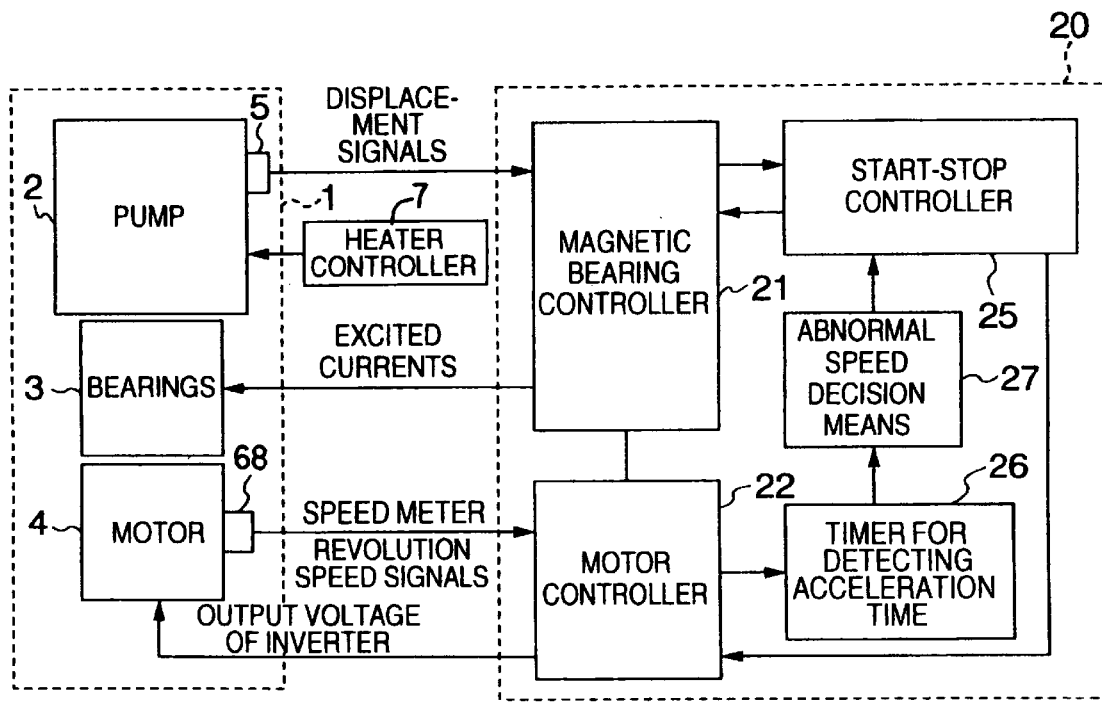
FIG. 25 is a block diagram showing a seventh embodiment of the turbo vacuum pump according to the present invention.
Figure 26:
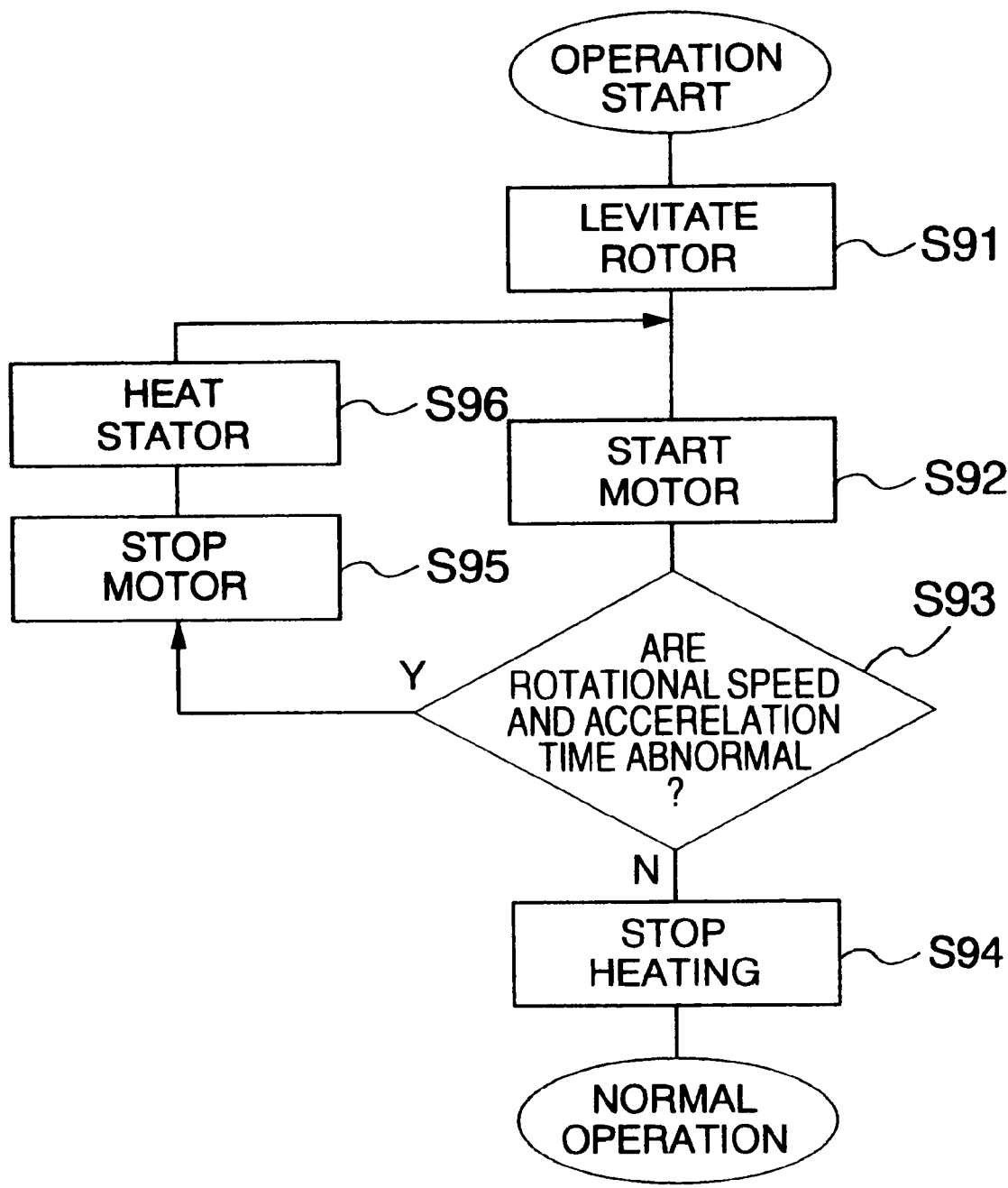
FIG. 26 is a flow chart showing the operations of the seventh embodiment of the present invention.

A block diagram of a seventh embodiment of the turbo vacuum pump according to the present invention is shown in FIG. 25, and a flow chart of the running method is shown in FIG. 26. In this embodiment, the abnormality deciding unit detects an abnormality in terms of the motor RPM and the acceleration time in place of the current value of the sixth embodiment shown in FIGS. 23 and 24.

When the operation of the turbo vacuum pump is commenced, the rotor is floated at Step s91 by the magnetic bearings, and the motor is driven at Step s92, as shown in FIG. 26. At Step s93, an abnormality is detected from the relation between the RPM and the acceleration time. If the acceleration is judged to be abnormal, the motor is stopped at Step s95, and the stator is heated at Step s96. When the stator temperature reaches a predetermined level, the aluminum chloride has been sublimated, and the motor is restarted at Step s92. The RPM and the acceleration time are again checked at Step s93. If normal, the heating of the stator is stopped at Step s94. Effects similar to those of the sixth embodiment can be obtained by this running method.

Figure 27:
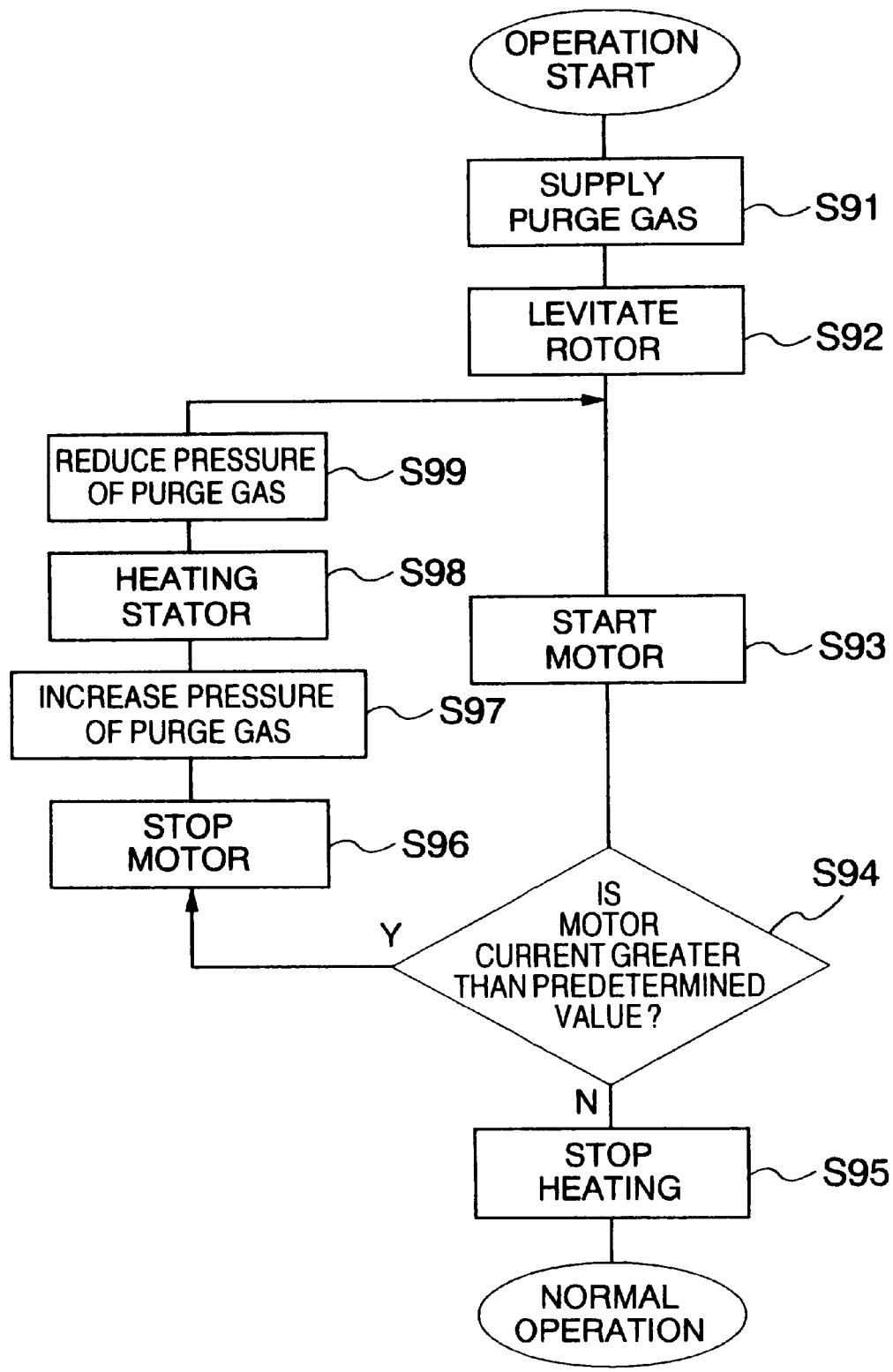
FIG. 27 is a flow chart showing the operations of an eighth embodiment of the turbo vacuum pump according to the present invention.

A flow chart which shows the operating method of an eighth embodiment of the turbo vacuum pump according to the present invention is shown in FIG. 27. Purge gas feed ports are formed in the bearing chambers of the turbo vacuum pump to feed the purge gas therefrom so that the electric parts such as the bearings or the motor may be protected against the heat.

At Step s91, purge gas is fed from the purge gas feed ports to the bearing chambers, the rotor is floated at Step s92, and the motor is started at Step s93. The motor current is checked for abnormality at Step s94. If it is abnormal, the motor is stopped at Step s95, the purge gas pressure is raised at Step s97, and the stator is heated at Step s98. At Step s99, the purge gas is returned to the initial level. The motor is started again a Step s93, and an abnormality is made at Step s94. If the motor current value is lower than the predetermined value, heating is stopped at Step s95.

In the present embodiment a reaction product, that is stuck and deposited between the rotor and the stator can be sublimated and prevented from sticking to the pump, thereby allowing the pump to be restarted. At the stator heating time moreover, s98 the purge gas is fed from the bearing chambers so that the electric parts such as the bearings and the motor can be thermally protected to retain their reliabilities. Moreover, unnecessary heating of the stator spares the energy. Although abnormal operation of the pump is determined in the present embodiment in terms of the current value, it can also be determined in terms of the RPM and the acceleration time.

In any of the foregoing embodiments, the clearances of the shaft, the bearings and so on are as follows. The centrifugal compression pump stage of the turbo vacuum pump has a clearance of about 0.2 to 0.5 mm in the thrust direction, as shown in FIG. 3, between the vanes 50 of the centrifugal impeller 51 and the stator 54, and between the vanes 51 and the impeller 53 of the stator 54. The clearance in the radial direction is larger than that in the thrust direction. The clearance of the peripheral flow compression pump stage 60A is exemplified, as shown in FIG. 6, by the clearance between the back faces of the vanes 60 and the stator 63 and the clearance between the vanes 60 and the partition 65 enclosing them. Both of these clearances are about 0.2 to 0.5 mm.

Moreover, the clearance of the touchdown bearings is set to a value smaller than that of the pump unit clearance so that the impeller and stator of the pump unit may not come into contact even when the magnetic bearings cannot support the rotor during the run of the vacuum pump. Specifically, the clearance between the running rotor and the touchdown bearings is 0.15 mm at one side when the rotor center is aligned with the center of rotation. Moreover, the touchdown bearings are set so that they support the motor, even when the turbo vacuum pump is transported, to prevent any contact between the rotor and the stator.

When the aforementioned turbo vacuum pump is employed in a dry etching apparatus, the clearance of the pump unit may be so small as to stick and deposit the reaction product or the aluminum chloride between the impeller and the stator, making it impossible to restart the pump. If, in this case, the magnetic bearings are controlled according to the timing chart shown in FIG. 28, the deposited reaction product can be gradually scraped off to enable the vacuum pump to restart. This behavior will be described in detail with reference to FIG. 10 and FIGS. 28 to 31.

Figure 28:
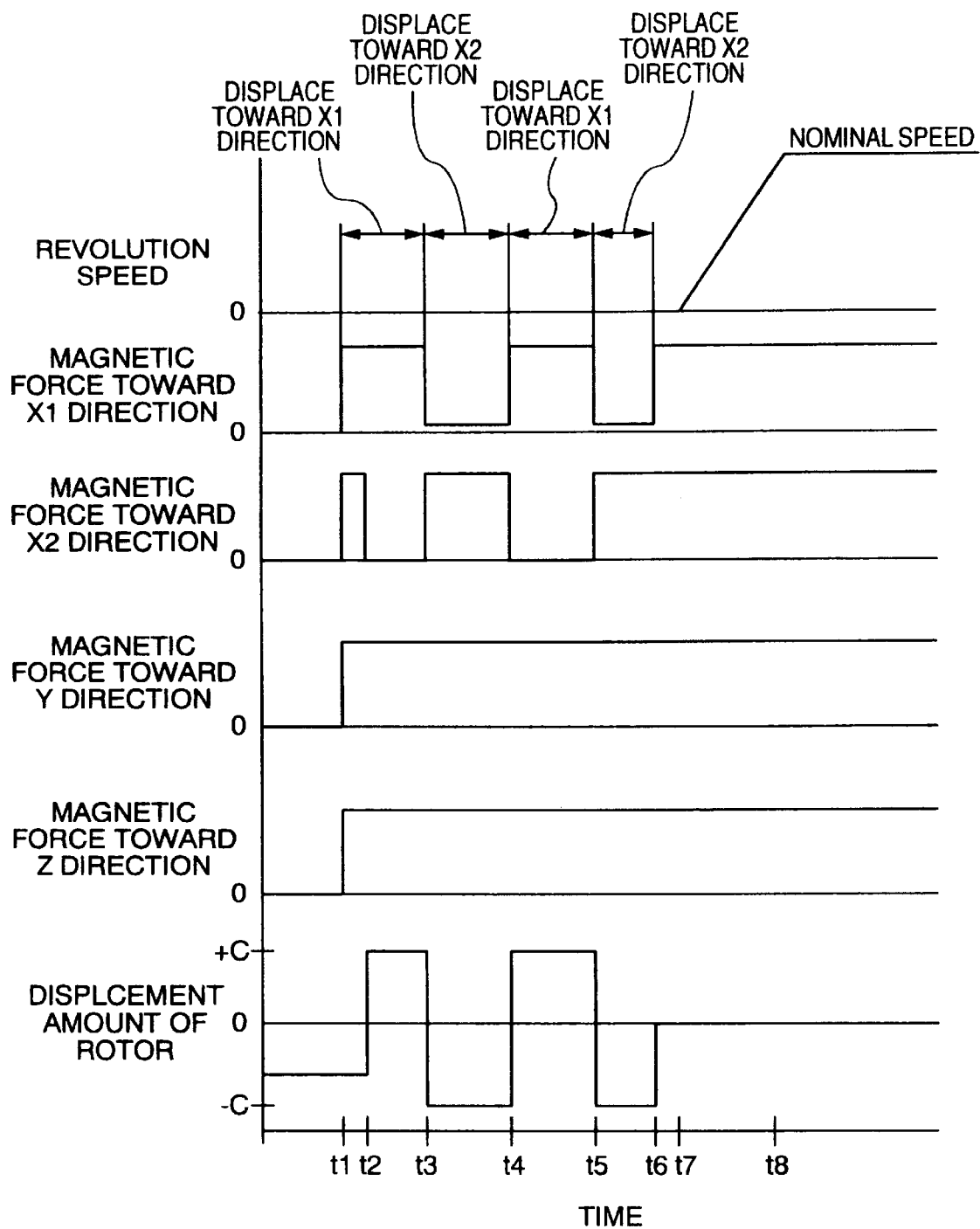
FIG. 28 is a timing chart of the controls of the bearings of a turbo vacuum pump according to the present invention.
Figure 29:
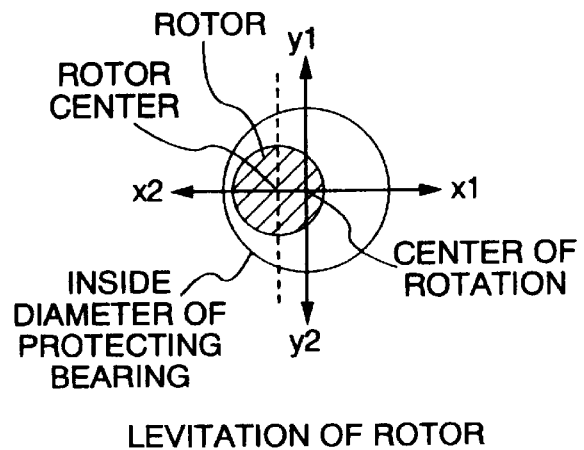
FIG. 29 is a diagram showing a displacement of the shaft of a turbo vacuum pump according to the present invention.

In the position of the rotor before the magnetic bearings are controlled, as shown in FIG. 29, the rotor center is not aligned with the center of rotation. The direction of this rotor displacement is designated by x2. At time t1, as shown in FIG. 28, all the magnetic bearings are controlled to float the rotor (Step s1 in FIG. 10). Then, the motor is started at Step s2 in FIG. 10. Since the reaction product disables rotation of the rotor, however, the motor is stopped at Step s4 when its current value exceeds the predetermined value (e.g., 150% of its rated current).

Figure 30:
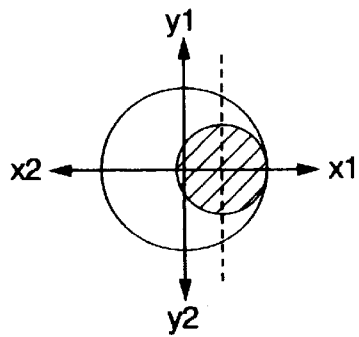
FIG. 30 is a diagram showing a displacement of the shaft of the turbo vacuum pump according to the present invention.

At time t2, the attraction in the direction x2 is weakened to move the rotor in the direction x1. In this case, the magnetic bearings may be controlled to strengthen the attraction in the direction x2. At this time, the rotor is moved to bring its center beyond the center of rotation, as shown in FIG. 30, until the clearance between the touchdown bearings and the rotor is reduced substantially to 0. In FIG. 28, the movement of the rotor is set at 0 when the rotor center is aligned with the center of rotation. With this setting, the displacement is signed with "+", if the rotor is displaced in the direction x1 from the 0 position, and with "−" if displaced in the direction x2 from the 0 position. The clearance of the touchdown bearings is 0.15 mm at one side when the rotor center is aligned with the center of rotation. Thus, the displacement of the rotor is 0.15 mm in the direction x1, 0.15 mm in the direction x2 and 0.3 at the maximum.

Figure 31:
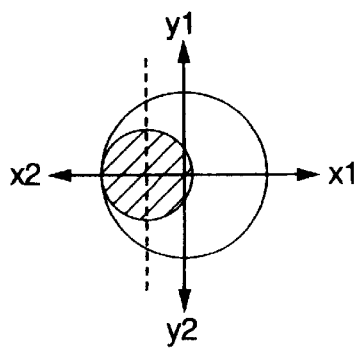
FIG. 31 is a diagram showing a displacement of the shaft of the turbo vacuum pump according to the present invention.

At time t3, the attraction is weakened in the direction x1 but strengthened in the direction x2 to move the rotor in the direction x2. At this time, the rotor is moved to bring its center beyond the center of rotation, as shown in FIG. 31, until the clearance between the touchdown bearings and the rotor is reduced substantially to 0. The displacement of the rotor is 2c, i.e., from +c to −c.

At next time t4, in order to move the rotor in the direction x1, the attraction is weakened in the direction x2 but strengthened in the direction x1. At time t5, moreover, in order to move the rotor in the direction x2, the attraction is weakened in the direction x1 but strengthened in the direction x2. At time t6, the magnetic bearings are controlled to strengthen the attraction in the direction x1 so much that the rotor is positioned at the center of rotation. In FIG. 28, therefore, the rotor is moved two times in the direction x1. If these moving operations are performed two to five times, the deposited reaction product can be sufficiently scraped off to start the turbo vacuum pump. At time t7, therefore, the motor is started to increase the rotor RPM, and at time t8, the rotor reaches the rated RPM to provide the desired pump performance.

The description thus far is directed to the case in which the rotor is moved in the direction x but it can be moved in the direction y as needed. Alternatively, the rotor may be moved in both the direct on x and the direction y. Moreover, the rotor may be moved, as shown in FIGS. 12 to 15. These modifications can be achieved by using a procedure similar to the aforementioned ones. Since the rotor is moved at the starting time of the turbo vacuum pump, moreover, the rotor can be released from locking to restart the pump even if the reaction product sticks and deposits after the previous use.

As has been described hereinbefore, in a turbo vacuum pump for exhausting from the atmospheric pressure, according to the individual embodiments of the present invention, the pump can be restarted by using the completely clean and maintenance-free magnetic bearings, even if the reaction product sticks during the period when the pump is stopped, so that a highly reliable turbo vacuum pump can be provided.

According to the present invention, even if the rotor is locked as result of sticking and deposition of the reaction product during stoppage of the pump, it can be restarted to exploit the completely clean and maintenance-free magnetic bearings.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A turbo vacuum pump comprising:

a housing having a suction port and an exhaust port;

a stator retained in said housing;

magnetic bearings mounted in said housing;

a rotary shaft supported rotatably by said magnetic bearings;

a drive unit which rotates said rotary shaft;

a control unit which controls said magnetic bearings, so that a gas sucked from said suction port is compressed and exhausted to the atmosphere from said exhaust port;

a first sensor which detects RPM of said rotary shaft; and a second sensor which detects at least one of electric current and power of said drive unit;

wherein said control unit provides said magnetic bearings with a command for displacing said rotary shaft by a predetermined amount, if the detected value of said second sensor exceeds a predetermined value when said first sensor detects a standstill of said rotary shaft.

2. A turbo vacuum pump according to claim 1, wherein:

said rotary shaft is provided with a centrifugal compression pump impeller and a multistage peripheral flow impeller sequentially from the side of said suction port; and said stator forms a multistage peripheral flow compression pump stage together with said peripheral flow impeller.

3. A turbo vacuum pump according to claim 1, wherein:

said rotary shaft is provided with a screw slot pump impeller and a multistage peripheral flow impeller sequentially from the side of said suction port; and said stator forms a screw slot compression pump stage and a multistage peripheral flow compression pump stage together with said screw slot impeller and said peripheral flow impeller.

4. A turbo vacuum pump comprising:

a housing having a suction port and an exhaust port;

a stator retained in said housing;

magnetic bearings mounted in said housing;

a rotary shaft supported rotatably by said magnetic bearings;

a drive unit which rotates said rotary shaft;

a magnetic bearing control unit which rotates said magnetic bearings, whereby a gas sucked from said suction port is compressed and exhausted to the atmosphere from said exhaust port;

a stator heating control unit which controls a heating of said stator to a predetermined temperature range prior to starting said vacuum pump;

a first sensor which detects RPM of said rotary shaft;

a second sensor which detects an acceleration time of said rotary shaft; and a controller which controls starting and stopping of said magnetic bearing control unit and said drive unit based on detected values of said first and second sensors.

5. A turbo vacuum pump according to claim 4, wherein:

said rotary shaft is provided with a centrifugal compression pump impeller and a multistage peripheral flow impeller sequentially from the side of said suction port; and said stator forms a multistage peripheral flow compression pump stage together with said peripheral flow impeller.

6. A method of running a turbo vacuum pump for exhausting to the atmosphere, which pump has a rotary shaft supported rotatably by magnetic bearings, said method comprising:

before said turbo vacuum pump is rotationally started, causing said magnetic bearings to displace said rotary shaft a predetermined number of times, until said turbo vacuum pump transfers to a steady run.

7. A turbo vacuum pump running method according to claim 6, wherein, after said rotary shaft has been displaced, a purge gas is fed from purge gas feed ports formed in bearing chambers for retaining said magnetic bearings.

8. A turbo vacuum pump running method according to claim 6, wherein said rotary shaft is displaced within a range in which it is kept out of engagement with touchdown bearings arranged in the vicinity of said magnetic bearings.

9. A turbo vacuum pump running method according to claim 6, wherein displacement of said rotary shaft comprises a movement parallel to an axial center of said rotary shaft.

10. A turbo vacuum pump running method according claim 6, wherein displacement of said rotary shaft comprises a reciprocation along a longitudinal axis of said rotary shaft.

11. A turbo vacuum pump running method according to claim 6, wherein displacement of said rotary shaft comprises a conical motion on the axial center of said rotary shaft.

12. A turbo vacuum pump running method according to claim 6, wherein displacement of said rotary shaft comprises a conical motion on a portion of said rotary shaft in the vicinity of one end.

13. A turbo vacuum pump running method according to claim 6, wherein movement of said rotary shaft comprises forward and reverse axial rotations, through a small angle.

14. A turbo vacuum pump running method according to claim 6, wherein a control unit heats a stator of said motor to a temperature ranging from 100° C. to 180° C. after a stop of the rotation of said turbo vacuum pump.

15. A method of running a turbo vacuum pump for exhausting to the atmosphere, which pump has a rotary shaft supported rotatably by magnetic bearings, said method comprising:

detecting magnitude of a motor current value and a consumed electric power of said motor at a time of starting rotation of said turbo vacuum pump;

stopping rotation of said rotary shaft if at least one of said current and said power is over a predetermined value; and causing said magnetic bearings to displace said rotary shaft a predetermined number of times.

16. A method of running a turbo vacuum pump for exhausting to the atmosphere, which pump has a rotary shaft supported rotatably by magnetic bearings, said method comprising:

detecting a rate of increase of RPM of said rotary shaft at the time of starting rotation of said turbo vacuum pump;

stopping rotation of said rotary shaft if said rate of increase is below a predetermined value; and causing said magnetic bearings to displace said rotary shaft a predetermined number of times.

17. A turbo vacuum pump running method according to claim 16, wherein a warning is made if said rate of increase of RPM is below a predetermined value after a movement of said rotary shaft is made a predetermined number of times.

18. A turbo vacuum pump running method according to claim 17, wherein said warning is made by a sound or by lighting a lamp.

19. A turbo vacuum pump comprising:

a housing having a suction port and an exhaust port;

a stator retained in said housing;

magnetic bearings mounted in said housing;

a rotary shaft supported rotatably by said magnetic bearings;

a drive unit which drives the rotary shaft;

a control unit which controls the magnetic bearings, whereby a gas sucked from said suction port is compressed and exhausted to the atmosphere from said exhaust port;

a centrifugal compression pump impeller and a multistage peripheral flow impeller provided on said rotary shaft, sequentially from the side of said suction port, whereby said stator forms a multistage peripheral flow compression pump stage together with said peripheral flow impeller;

a first sensor which detects RPM of said rotary shaft;

a second sensor which detects an abnormality of said rotary shaft;

a heating unit which heats said stator;

a first controller or displacing said rotary shaft by a predetermined amount based on detected values of said first and second sensors; and a second controller which controls heating of said stator by said heating means, to a temperature ranging from 100° C. to 180° C.

20. A turbo vacuum pump comprising:

a housing having a suction port and an exhaust port;

a stator retained in said housing;

magnetic bearings mounted in said housing;

a rotary shaft supported rotatably by said magnetic bearings;

a drive unit which rotates said rotary shaft;

a first control unit which controls said magnetic bearings, so that a gas sucked from said suction port is compressed and exhausted to the atmosphere from said exhaust port;

a stator heating control unit which controls a heating of said stator to a predetermined temperature range prior to starting said vacuum pump;

a first sensor which detects RPM of said rotary shaft; and a second sensor which detects at least one of electric current and power of said drive unit;

wherein said first control unit provides said magnetic bearings with a command for displacing said rotary shaft by a predetermined amount, if the detected value of said second sensor exceeds a predetermined value when said first sensor detects a standstill of said rotary shaft.

* * * * *